US009332505B2

(12) United States Patent
Siomina et al.

(10) Patent No.: US 9,332,505 B2
(45) Date of Patent: May 3, 2016

(54) METHODS AND APPARATUS FOR PERFORMING MEASUREMENTS IN ADAPTIVE DOWNLINK POWER TRANSMISSION

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 121 days.

(21) Appl. No.: 14/356,301

(22) PCT Filed: Nov. 9, 2012

(86) PCT No.: PCT/SE2012/051222
§ 371 (c)(1),
(2) Date: May 5, 2014

(87) PCT Pub. No.: WO2013/070166
PCT Pub. Date: May 16, 2013

(65) Prior Publication Data
US 2014/0286219 A1 Sep. 25, 2014

Related U.S. Application Data

(60) Provisional application No. 61/558,659, filed on Nov. 11, 2011.

(51) Int. Cl.
*G08C 17/00* (2006.01)
*H04W 52/18* (2009.01)
(Continued)

(52) U.S. Cl.
CPC ........... *H04W 52/18* (2013.01); *H04J 11/0023* (2013.01); *H04W 24/10* (2013.01)

(58) Field of Classification Search
CPC .... H04W 52/18; H04W 24/10; H04J 11/0023
See application file for complete search history.

(56) References Cited

U.S. PATENT DOCUMENTS

2007/0042784 A1* 2/2007 Anderson ............. H04W 52/34
455/450
2008/0013500 A1* 1/2008 Laroia .................. H04B 7/2621
370/338
(Continued)

FOREIGN PATENT DOCUMENTS

WO 2012023894 A1 2/2012
WO 2012154094 A1 11/2012

OTHER PUBLICATIONS

Author Unknown, "Technical Specification Group Radio Access Network; Evolved Universal Terrestrial Radio Access (E-UTRA); Base Station (BS) radio transmission and reception (Release 10)," Technical Specification 36.104, Version 10.4.0, 3GPP Organizational Partners, Sep. 2011, 112 pages.
(Continued)

*Primary Examiner* — Robert Wilson
(74) *Attorney, Agent, or Firm* — Withrow & Terranova, PLLC

(57) ABSTRACT

A wireless device, and a method therein, for performing a measurement on a first type of radio signal. The wireless device is comprised in a communications network. The wireless device receives at least two resource specific parameters for the first type of radio signal. The at least two resource specific parameters indicate different transmit power levels of the first type of radio signal and the different transmit power levels relate to two different resources in two different time periods for the first type of radio signal. Further, the wireless device receives a first type of radio signal transmitted at two different transmit power levels, and performs at least one measurement on the received first type of radio signal using the at least two resource specific parameters.

86 Claims, 10 Drawing Sheets

(51) Int. Cl.
*H04J 11/00* (2006.01)
*H04W 24/10* (2009.01)

(56) References Cited

U.S. PATENT DOCUMENTS

| | | | |
|---|---|---|---|
| 2010/0254276 A1* | 10/2010 | Nishikawa | H04L 1/0029 370/252 |
| 2011/0003557 A1* | 1/2011 | Morita | H04W 72/085 455/67.11 |
| 2012/0184315 A1* | 7/2012 | Oteri | H04W 52/241 455/509 |
| 2014/0286219 A1* | 9/2014 | Siomina | H04J 11/0023 370/311 |
| 2015/0003388 A1* | 1/2015 | Mazzarese | H04W 24/08 370/329 |
| 2015/0011233 A1* | 1/2015 | Kazmi | H04W 16/14 455/454 |
| 2016/0021695 A1* | 1/2016 | Axmon | H04W 24/08 370/329 |
| 2016/0028533 A1* | 1/2016 | Kazmi | H04W 72/1278 370/296 |

OTHER PUBLICATIONS

Author Unknown, "Technical Specification Group Radio Access Network; Evolved Universal Terrestrial Radio Access (E-UTRA); Requirements for support of radio resource management (Release 10)," Technical Specification 36.133, Version 10.4.0, 3GPP Organizational Partners, Sep. 2011, 462 pages.

Author Unknown, "Technical Specification Group Radio Access Network; Evolved Universal Terrestrial Radio Access (E-UTRA); Physical Channels and Modulation (Release 10)," Technical Specification 36.211, Version 10.3.0, 3GPP Organizational Partners, Sep. 2011, 103 pages.

Author Unknown, "Technical Specification Group Radio Access Network; Evolved Universal Terrestrial Radio Access (E-UTRA); Physical layer procedures (Release 10)," Technical Specification 36.213, Version 10.3.0, 3GPP Organizational Partners, Sep. 2011, 122 pages.

Author Unknown, "Technical Specification Group Radio Access Network; Evolved Universal Terrestrial Radio Access (E-UTRA); Physical layer; Measurements (Release 10)," Technical Specification 36.214, Version 10.1.0, 3GPP Organizational Partners, Mar. 2011, 13 pages.

Author Unknown, "Technical Specification Group Radio Access Network; Evolved Universal Terrestrial Radio Access Network (E-UTRAN); X2 application protocol (X2AP) (Release 10)," Technical Specification 36.423, Version 10.3.0, 3GPP Organizational Partners, Sep. 2011, 132 pages.

Huawei et al., "R3-112370: Tuning Transmission Power of ABSs," 3rd Generation Partnership Project (3GPP), TSG-RAN WG3 Meeting #73bis, Oct. 10-14, 2011, 4 pages, Zhuhai, China.

International Search Report for PCT/SE2012/051222 mailed Mar. 13, 2013, 2 pages.

* cited by examiner

METHODS AND APPARATUS FOR PERFORMING MEASUREMENTS IN ADAPTIVE DOWNLINK POWER TRANSMISSION

This application is a 35 U.S.C. §371 national phase filing of International Application No. PCT/SE2012/051222, filed Nov. 9, 2012, the disclosure of which is incorporated herein by reference in its entirety.

TECHNICAL FIELD

The technology relates to radio communications, and in particular, to interference coordination in wireless networks and in particular to wireless networks with downlink (DL) interference issues.

TECHNICAL BACKGROUND

The interest in deploying low-power nodes, such as pico base stations, home eNodeBs, relays, remote radio heads, etc, for enhancing the macro network performance in terms of the network coverage, capacity, and service experience of individual users has been constantly increasing over the last few years. At the same time, there is a need for enhanced interference management techniques to address interference issues caused, for example, by a significant transmit power variation among different cells and cell association techniques developed earlier for more uniform networks.

In the $3^{rd}$ Generation Partnership Project (3GPP), heterogeneous network deployments are defined as deployments where low-power nodes of different transmit powers are placed throughout a macro-cell layout leading to non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adapt to the traffic needs and the environment. However, heterogeneous deployments bring also challenges for which the network needs to be prepared to ensure efficient network operation and superior user experience. Some challenges are related to the increased interference in the attempt to increase small cells associated with low-power nodes—cell range expansion. Other challenges relate to potentially high interference in uplink due to a mix of large and small cells.

In a heterogeneous deployment, according to 3GPP, low power nodes are placed throughout a macro-cell layout. The interference characteristics in a heterogeneous deployment can be significantly different than in a homogeneous deployment, in the downlink, the uplink, or both. Examples are shown in FIG. 1, where in case (a), a macro user with no access to a Closed Subscriber Group (CSG) cell is interfered by the home base station HeNB, in case (b), a macro user causes severe interference towards the HeNB, in case (c), a CSG user is interfered by another CSG HeNB, and in case (d) a UE is served by a pico cell in the expanded cell range area. Thus, in general it should be understood that a heterogeneous deployment does not necessarily involve CSG cells.

Interference Coordination in Heterogeneous Networks.

HetNet solutions for Long-Term Evolution (LTE) focus on the DL. The need for enhanced Inter-Cell Interference Coordination (eICIC) techniques for DL transmissions in such HetNets is particularly crucial when the cell assignment rule diverges from the Reference Signal Received Power (RSRP)-based approach, e.g., towards path loss-based or path gain-based approach, sometimes also referred to as the cell range expansion when adopted for cells with a transmit power lower than neighbor cells. The concept of the cell range expansion is illustrated in FIG. 2, where the cell range expansion of a pico cell is implemented using a delta-parameter, Δ.

To facilitate measurements in the extended cell range, i.e., where high interference is expected, the 3GPP standard specifies Almost Blank Subframe (ABS) patterns for eNodeBs and restricted measurement patterns for UEs. A pattern is a bit string indicating restricted and unrestricted subframes characterized by a length and periodicity, which are different for Frequency Division Duplexing (FDD) and Time Division Duplexing (TDD), e.g. 40 subframes for FDD and 20, 60 or 70 subframes for TDD. Restricted measurement subframes are configured to allow the UE to perform measurements in subframes with improved interference conditions, which may be implemented by configuring ABS patterns at eNodeBs, and avoid measuring in high-interference conditions. Restricted measurement patterns are in general UE-specific. Three patterns are currently specified in the 3GPP standard to enable restricted measurements: (1) serving-cell pattern for Radio Link Monitoring (RLM) and Remote Monitoring and Management (RRM) measurements, (2) neighbor-cell pattern for RRM measurements, and (3) serving-cell pattern for Channel State Information (CSI) measurements.

An ABS pattern is a transmission pattern at the radio node; it is cell-specific and may be different from the restricted measurement patterns signaled to the UE. In a general case, ABS patterns are low-power and/or low-transmission activity subframes. ABS patterns may be exchanged between eNodeBs via X2, but these patterns are not signalled to the UE, unlike the restricted measurement patterns.

Transmit Activity Patterns.

ABS is one example of transmit activity patterns. The pattern is specified per cell, and in the current standard may be exchanged between eNodeBs via X2. ABS is currently defined as "a subframe with reduced power on some physical channels and/or reduced activity," see 3GPP TS 36.423. There are other signaling enhancements of transmit activity patterns. Multi-level patterns have been described where the "level" may be associated with a decision comprising a setting of one or more parameters where the setting characterizes a low-transmission activity, and the parameters may e.g. be any of transmit power, bandwidth, frequency, subset of sub-carriers, etc. This is closely related to the actively discussed currently in 3GPP reduced transmit power subframes, e.g. non-empty ABS subframes where some data transmissions may be scheduled but with a lower power. Such patterns may be signaled to the UE. Such patterns may be associated with either overall transmissions from the node or particular signal(s), e.g. positioning reference signals (PRS), or channel(s), e.g. data channels and/or control channels. It has been described that the serving network node may indicate to the UE that DL and/or uplink (UL) ABS, or any type of low interference DL and/or UL sub-frames, are configured in certain sub-frames. The UE becomes thus aware of the transmit pattern of the serving or neighbor radio node and may use this information for performing an auxiliary action, e.g., going to a sleeping mode, executing low-priority tasks, etc. Transmit activity patterns may also be signaled to other network nodes, e.g., positioning node. The patterns are not defined though for physical signals (physical signals include also reference signals), but for Physical Downlink Shared Channel (PDSCH).

Downlink Transmissions and Power Allocation.

The transmit power information may be used, e.g., for path loss estimation, channel estimation, estimation of the signal for advanced receiver techniques, e.g., interference suppression or interference cancellation, ensuring consistent signal measurements, e.g., Reference Signal Received Power (RSRP) or Reference Signal Received Quality (RSRQ), etc. Some example applications are power control, e.g., UL power control based on DL path loss, interference coordination, e.g., determining the distance to a neighbour node or interference estimation for a cell, DL transmit power adjustment by home eNodeBs for co-channel co-existence with other radio nodes, self-organizing network (SON), positioning, e.g., using path loss for distance estimation or as a fingerprint, etc.

The power allocation approaches for different downlink signals and channels are further described. There are also some limited means of informing the UE about the DL transmit power. In general, if the measuring node is not aware of the transmit power levels, the received signal variation due to the transmit power changes is hard (if possible at all) to distinguish from fast fading and shadowing effects.

The following physical signals may be transmitted in DL with the current LTE standard: (1) reference signals such as cell-specific reference signals (CRS), Multicast-Broadcast Single Frequency Network (MBSFN) reference signals, UE-specific reference signals (DM-RS), positioning reference signals (PRS), CSI reference signals (CSI-RS), and (2) synchronization signals such as primary synchronization signals (PSS) and secondary synchronization signals (SSS). The following channels may be transmitted in DL: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH). These channels are used for different purposes e.g. to transmit data, control, broadcast information etc. Examples of data channels are Physical Downlink Shared Channel (PDSCH) and Physical Multicast Channel (PMCH). The PMCH carries data which is broadcasted to multiple users typically from multiple base stations. Examples of control channels are Physical Control Format Indicator Channel (PCFICH), Physical Downlink Control Channel (PDCCH) and Physical Hybrid ARQ Indicator Channel (PHICH). An example of a broadcast channel is Physical Broadcast Channel (PBCH).

DL Power Allocation.

UMTS provides dynamic DL power control generally based on measurements performed by the UE on UE-specific pilot signals, which are transmitted on a UE-specific DL physical channel called DPCCH. With High-Speed Downlink Packet Access (HSDPA) without a dedicated channel, the Transmit Power Control (TPC) commands sent on F-DPCH are used by the UE for downlink power control. The UE however may still use the common pilot signals, e.g. common pilot channel (CPICH), for performing channel estimation.

In LTE, there is no dynamic DL power control like there is in UMTS. However, the Base Station (BS) may still perform some sort of power adjustment, e.g. for data transmissions and for PRS, based on UE measurements like CSI reports, although the power variation may not be sufficient to maintain the channel estimation quality. Hence there are some basic means for DL power adjustment for specific channels/signals, in addition to general BS power requirements.

DL Transmit Power Parameters and Requirements.

The DL transmit power levels are typically defined by at least the following parameters:

Output power (Pout) of BS is the mean power of one carrier delivered to a load with resistance equal to the nominal load impedance of the transmitter.

Maximum total output power (Pmax) of BS is the mean power level measured at the antenna connector during the transmitter ON period in a specified reference condition.

Rated total output power of BS is the mean power for BS operating in single carrier, multi-carrier, or carrier aggregation configurations that the manufacturer has declared to be available at the antenna connector during the transmitter ON period.

Maximum output power (Pmax,c) of BS is the mean power level per carrier measured at the antenna connector during the transmitter ON period in a specified reference condition (e.g. min/max temperatures, relative humidity, etc). The reference conditions are used to verify the BS maximum output power, e.g., when testing.

Rated output power (PRAT) of BS is the mean power level per carrier for BS operating in single carrier, multi-carrier, or carrier aggregation configurations that the manufacturer has declared to be available at the antenna connector during the transmitter ON period (see Table 1). Different PRATs may be declared for different configurations.

TABLE 1

Base Station rated output power [TS 36.104, Table 6.2-1]

| BS class | PRAT |
|---|---|
| Wide Area BS | No upper power limit |
| Local Area BS | ≤+24 dBm (for one transmit antenna port) |
| | ≤+21 dBm (for two transmit antenna ports) |
| | ≤+18 dBm (for four transmit antenna ports) |
| | <+15 dBm (for eight transmit antenna ports) |
| Home BS | ≤+20 dBm (for one transmit antenna port) |
| | ≤+17 dBm (for two transmit antenna ports) |
| | ≤+14 dBm (for four transmit antenna ports) |
| | <+11 dBm (for eight transmit antenna ports) |

Typically, in normal conditions, the BS maximum output power shall remain within +2 dB and −2 dB of the rated output power. In extreme conditions, the base station maximum output power shall remain within +2.5 dB and −2.5 dB of the rated output power. Home BS output power Pout may need to be further adjusted to protect another Universal Terrestrial Radio Access (UTRA) network or Evolved-UTRA (E-UTRA) network on adjacent channel or E-UTRA network on the same channel. The transmitter OFF power is determined by requirements. The value is measured over a certain period and the spectral density shall be less than −85 dBm/MHz [36.133]. There are also transient period between power ON and power OFF states, for which the length is determined by requirements.

Dynamic range requirements include Total power dynamic range, the difference between the maximum and the minimum transmit power of an Orthogonal Frequency Division Multiplexing (OFDM) symbol for a specified reference condition, is given by Pmax-P_RB, where P_RB is OFDM symbol (carrying PDSCH and not containing RS, PBCH or PSS/SSS) power when 1 Resource Block (RB) is transmitted. The requirement is bandwidth-dependent and the value increases with the bandwidth, starting from 7.7 dB for 1.4. MHz. Dynamic range requirements also include Resource Element (RE) Power control dynamic range, the difference between the power of an RE and the average RE power for a BS at maximum output power for a specified reference condition. The current requirement is as shown in Table 2.

TABLE 2

E-UTRA BS RE power control dynamic range (TS 36.104, Table 6.3.1.1-1)

| Modulation scheme used on the RE | RE power control dynamic range (dB) | |
|---|---|---|
| | (down) | (up) |
| QPSK (PDCCH) | −6 | +4 |
| QPSK (PDSCH) | −6 | +3 |
| 16QAM (PDSCH) | −3 | +3 |
| 64QAM (PDSCH) | 0 | 0 |

NOTE 1:
The output power per carrier shall always be less or equal to the maximum output power of the base station.

The above transmit power parameters and requirements are not signalled to the UE or exchanged over X2, although they may still be communicated among network nodes e.g. via an Operation and Maintenance (O&M) node. The parameters are verified by conformance tests, which means that changing any of the described requirements, e.g., as proposed below, may require new test configurations and new test procedures.

The following parameters may be exchanged between eNodeBs via X2, e.g., for the purpose of interference coordination. RNTP (Relative Narrowband TX Power) indication is the maximum ratio of the maximum intended Energy Per Resource Element (EPRE) of UE-specific PDSCH REs in OFDM symbols not containing RS to the maximum nominal power [TS 36.211]. RNTP is defined over a physical resource block (PRB) in a cell and may be exchange among eNodeBs via X2, e.g., to enable interference aware scheduling. RNTP can be viewed as an eNodeB "promise" to not exceed a certain power level in the specified symbols. The currently specified value range for RNTP is $RNTP_{threshold} \in \{-\infty, -11, -10, -9, -8, -7, -6, -5, -4, -3, -2, -1, 0, +1, +2, +3\}$. The signalled RNTP threshold may be selectively applied for indicated by signalling PRBs (i.e., in frequency).

The transmit power of specific signals and channels in LTE also follows the general rules above. In LTE in general, the DL transmit power for specific signals/channels is typically determined in relation to the nominal power or to the Reference Signal (RS) power, e.g., cell-specific RS or UE-specific RS, as explained in more detail below.

Nominal CRS power is typically assumed when more than one antenna port are used. When CRS is transmitted from one antenna port, the transmit power may be boosted by 3 dB to use the unused power of the second port. The currently specified UE behavior is that a UE may assume [see 3GPP TS 36.213] downlink cell-specific RS EPRE is constant across the downlink system bandwidth and constant across all subframes until different cell-specific RS power information is received. The downlink reference-signal transmit power is defined as the linear average over the power contributions (in [W]) of all resource elements that carry cell-specific reference signals within the operating system bandwidth. The downlink cell-specific reference-signal EPRE can be derived from the downlink reference-signal transmit power given by the parameter referenceSignalPower provided to the UE by higher layers.

CRS are transmitted in all non-MBSFN subframes in predefined symbols and subcarriers and in the $1^{st}$ symbol in MBSFN subframes. Effectively a 6-reuse and a 3-reuse scheme over subcarriers are used when one and more than one transmit antenna are used for CRS, respectively.

In 3GPP TS 36.214, the following E-UTRAN measurement is defined for DL RS TX power:

configuration information which may be included in the Information Element (IE) RadioResourceConfigCommon-SIB (in SIB2) and IE RadioResourceConfigCommon which are used to specify common radio resource configurations in the system information and in the mobility control information, respectively.

The referenceSignalPower may be transmitted for any serving cell, i.e. including secondary cells SCells with carrier aggregation CA.

```
-- ASN1START
PDSCH-ConfigCommon ::=      SEQUENCE {
    referenceSignalPower        INTEGER (-60..50),
    p-b                         INTEGER (0..3)
}
PDSCH-ConfigDedicated::=    SEQUENCE {
    p-a                         ENUMERATED {
                                    dB-6, dB-4dot77, dB-3, dB-1dot77,
                                    dB0, dB1, dB2, dB3}
}
-- ASN1STOP
```

MBSFN RS is used when MBMS transmissions are present in MBSFN subframes; otherwise, the MBSFN RS is not transmitted in MBSFN subframes if the latter are configured.

If CSI-RS is configured in a serving cell then a UE shall assume downlink CSI-RS EPRE is constant across the downlink system bandwidth and constant across all subframes. Zero-power CSI-RS may also be configured, and the corresponding subframe configuration may be provided separately for non-zero-power and zero-power CSI-RS, where the subframe configuration comprises offset and periodicity (5, 10, 20, 40, or 80 ms). One non-zero-power and one or more zero-power CSI-RS configurations may be configured simultaneously. The current 3GPP standard does not specify absolute or relative power specifically for CSI-RS.

The current 3GPP standard does not specify absolute or relative power specifically for DM-RS.

PRS are defined to support Observed Time Difference of Arrival OTDOA positioning. PRS are transmitted with a 9-reuse scheme over subcarriers in non-CRS symbols in positioning subframes. Several consecutive positioning subframes (1, 2, 4, or 6) are grouped into a positioning occasion. Positioning occasions have periodicity of 160, 320, 640, and 1280 ms. PRS may be transmitted over bandwidth smaller than system bandwidth or general-purpose measurement bandwidth.

The current 3GPP standard does not specify absolute or relative power for PRS, but only that it is constant within a positioning occasion. PRS muting may also be configured by

| Definition | Downlink reference signal transmit power is determined for a considered cell as the linear average over the power contributions (in [W]) of the resource elements that carry cell-specific reference signals which are transmitted by the eNode B within its operating system bandwidth. |
|---|---|
| | For DL RS TX power determination the cell-specific reference signals $R_0$ and if available $R_1$ according TS 36.211 [3] can be used. |
| | The reference point for the DL RS TX power measurement shall be the TX antenna connector. |

The result of this measurement may be communicated by higher layers to the UE. For example, the downlink cell-specific reference-signal (CRS) Energy Per Resource Element (EPRE) can be derived from the downlink reference-signal transmit power given by the parameter referenceSignalPower signalled via RRC as a part of PDSCH the network; the network may indicate PRS muting occasions to the UE, and the UE assumes that PRS are not transmitted in the indicated occasions.

The tests are defined for PRS transmit power being the same as CRS transmit power [see TS 36.133]. Boosting of PRS power has been discussed and in fact when there are no PDSCH transmitted in positioning subframes and PRS transmit power is the same as nominal power, there is an amount of unused power in each PRS symbol which can be used to enhance hearability of PRS signals since the UEs have to detect PRS of several neighbor cells with a good geometry to enable OTDOA positioning and the neighbor cells may be located relatively far.

The current standard does not specify absolute or relative power specifically for synchronization signals PSS/SSS.

The transmit power of the downlink shared channel PDSCH is important to know for the UE. Therefore, in the current specification, it is indicated relative to the RS. Further, for higher-order MCSs, either small or no deviation from the RS transmit power is typically allowed. When UE-specific RS are not present, the ratio of PDSCH EPRE to cell-specific RS EPRE among PDSCH REs (not applicable to PDSCH REs with zero EPRE) for each OFDM symbol is denoted by UE-specific $\rho_A$ or $\rho_B$ parameters, depending on a pre-defined OFDM symbol index and where: $\rho_A = \delta_{power\text{-}offset} + P_A + 10 \log_{10}(2)_{[dB]}$ when transmit diversity is assumed for receiving PDSCH using 4 CRS antenna ports, or $\rho_A = \delta_{power\text{-}offset} + P_A$ [dB], otherwise; $\delta_{power\text{-}offset}$ is 0 dB for all PDSCH transmission schemes except multi-user MIMO, $P_A$ is a UE specific parameter provided by higher layers (via RRC) and it may be {−6 dB, −4.77 dB, −3 dB, −1.77 dB}, $P_B$ is cell specific provided by higher layers (via RRC) and indicates a value of the ratio $\rho_B/\rho_A$ which may be in the range [2/5; 5/4]. $P_B$ may also be exchanged via X2 among radio BSs. $\rho_B$ is typically associated with symbols in the control region (see TS 36.211, Tables 5.2.2 and 5.2.3 for more details). For example, for one or two transmit antenna ports with normal CP, $\rho_B$ is used for symbols 0 and 4 in slot 0. When UE-specific RS are present, the ratio is with respect to the UE-specific RS EPRE and in most cases it is zero. When CSI-RS are present, the assumed ratio of PDSCH EPRE to CSI-RS EPRE when UE derives CSI feedback is controlled by network-signaled parameter $P_c$ which takes values in the range of [−8, 15] dB with 1 dB step size.

SUMMARY

There are problems that may occur with existing solutions. One set of problems relates to a requirements limitation. Current dynamic range requirements are not sufficient to enable fully functional low-interference subframes. There are no requirements to ensure performance for power variation, e.g., transition periods, power adjustment accuracy, etc., both for physical signal(s) transmit power adjustment and the total transmit power adjustment between different periods for transmissions in the same direction, e.g., downlink.

Another problem area is that the UE assumes that the RS, e.g., CRS, CSI-RS, PRS, etc., power is constant across all subframes, i.e., there is no possibility to use a different power level for these signals in different subframes which e.g. does not allow to control the interference to other cells at certain time instances e.g. in ABS subframes. For example, PRS power may be boosted, but some PRS subframes may coincide with ABS subframes leading to unclear UE interpretation of the transmit power assumption and potentially high interference from PRS (even higher than that from CRS).

Another problem area is that the UE assumes that the reference signal power is constant across the DL system bandwidth (BW). The measurement bandwidth, which is common for all measured cells, may be different or same for different UEs in connected state; it may be smaller than the system bandwidth of the measured cell. In idle mode one common measurement BW, which is broadcasted, is common for all UEs in a cell. The measurement BW can be changed over time. In that case a new measurement BW has to be signalled to the UE. Some signals (e.g., PRS) may also have a transmission bandwidth or measurement bandwidth smaller than the system or cell bandwidth. There is no possibility to reduce transmission power on reference signals on a part of the bandwidth, e.g., in block of time frequency resources at an edge of a carrier or a band to reduce interference to an adjacent carrier or band, although there is a possibility to configure a measurement band smaller than the system bandwidth.

Another problem relates to the limited signalling available. The power information received via dedicated signalling also applies for all subframes and is not associated with a specific measurement configuration, e.g., specific time instances (such as subframes) and/or frequency resources (such as bandwidth or a part of a carrier or a band). The benefit of this existing dedicated signaling is that it allows the UE to avoid reading the system information, which takes time and consumes UE resources. This overhead may be acceptable to facilitate handover, since typically there are not so many UEs in handover zones. Using this signaling under dynamically configured power would result in a lot of signaling overhead. Further, using the current dedicated signalling for transmitting other power levels would not be consistent with the UE implementation, since a UE reading the SI and receiving the dedicated information may be confused and behave unexpectedly. Current ranges of the parameters associated with data transmissions in low-interference subframes are not sufficient to enable fully functional low-interference subframes.

Limited flexibility in controlling the reference signal transmit power is still another problem. Currently, there is no possibility to configure PRS power with a large (e.g., larger than 3 dB for the same number of antenna ports) difference from the CRS power and no signalling means from network node (e.g., eNodeB or positioning node) to the UE or other node (e.g., eNodeB or positioning node). Due to the assumption that reference signals are always signalled, there is no possibility for radio node to dynamically change the transmit power, at least on CRS.

These and other problems are addressed and overcome using a radio network node (e.g., eNode B) that signals to a UE at least two resource-specific parameters that indicate different transmit power levels of the same signal in at least two different time periods (e.g., signaling of CRS transmit power levels in ABS and non-ABS subframes). The radio network node also signals the at least two resource-specific parameters associated with transmit power levels of the same signal to other network nodes, which may use them for radio network operation tasks. A UE node receives the at least two resource-specific parameters of same signal from the radio network node and performs at least one measurement according to the received information. The UE reports the performed measurement results to the network and signals to the network the UE capability of handling and using resource-specific transmitted power information for one or more tasks, e.g., measurements.

An object of embodiments herein is to provide a way of improving the performance in a communications network.

According to a first aspect of embodiments herein, the object is achieved by a method in a wireless device for performing a measurement on a first type of radio signal. The wireless device is comprised in a communications network.

The wireless device receives at least two resource specific parameters for the first type of radio signal, which at least two resource specific parameters indicate different transmit power levels of the first type of radio signal, wherein the different transmit power levels relate to two different resources in two different time periods for the first type of radio signal.

Further, the wireless device receives a first type of radio signal transmitted at two different transmit power levels, and performs at least one measurement on the received first type of radio signal using the at least two resource specific parameters.

According to a second aspect of embodiments herein, the object is achieved by a wireless device for performing a measurement on a first type of radio signal. The wireless device is comprised in a communications network.

The wireless device comprises a receiving circuit configured to receive at least two resource specific parameters for the first type of radio signal. The at least two resource specific parameters indicate different transmit power levels of the first type of radio signal, and the different transmit power levels relate to two different resources in two different time periods for the first type of radio signal.

The receiving circuit is further configured receive a first type of radio signal transmitted at two different transmit power levels.

Further, the wireless device comprises a performing circuit configured to perform at least one measurement on the received first type of radio signal using the at least two resource specific parameters.

According to a third aspect of embodiments herein, the object is achieved by a method in an assisting network node for assisting a wireless device in performing a measurement on a first type of radio signal. The assisting network node and the wireless device are comprised in a communications network.

The assisting network node determines at least two different resources for the first type of radio signal in two different time periods, each of which at least two resources is associated with a resource specific parameter.

Further, the assisting network node transmits a first type of radio signal at different transmit power levels to the wireless device.

Furthermore, the assisting network node transmits, to the wireless device, the at least two resource specific parameters that indicate different transmit power levels of the first type of radio signal associated with two different time periods. The different transmit power levels relate to the two different resources. Thereby, the wireless device may perform at least one measurement on the first type of radio signal using the at least two resource specific parameters.

According to a fourth aspect of embodiments herein, the object is achieved by an assisting network node for assisting a wireless device in performing a measurement on a first type of radio signal. The assisting network node and the wireless device are comprised in a communications network.

The assisting network node comprises a determining circuit configured to determine at least two different resources for the first type of radio signal in two different time periods, each of which at least two resources is associated with a resource specific parameter.

Further, the assisting network node comprises a transmitting circuit configured to transmit, to the wireless device, a first type of radio signal at different transmit power levels.

The transmitting circuit is further configured to transmit, to the wireless device, the at least two resource specific parameters that indicate different transmit power levels of the first type of radio signal associated with two different time periods. The different transmit power levels relate to the two different resources. Thereby, the wireless device may perform at least one measurement on the received first type of radio signal using the at least two resource specific parameters.

According to a fifth aspect of embodiments herein, the object is achieved by a method in an assisting network node for assisting a performing network node in performing a radio network operation task. The assisting network node and the performing network node are comprised in a communications network.

The assisting network node determines at least two different resources for a first type of radio signal. Each resource is associated with a resource specific parameter, and one of the at least two resources has a lower interference than the other of the at least two resources.

Further, the assisting network node transmits, to the performing network node, the at least two resource specific parameters. The at least two resource specific parameters indicate different transmit power levels of the first type of radio signal, and the different transmit power levels relate to the at least two different resources in two different time periods for the first type of radio signal. Thereby, the performing network node may perform the radio network operation task using the at least two resource specific parameters.

According to a sixth aspect of embodiments herein, the object is achieved by an assisting network node for assisting a performing network node in performing a radio network operation task. The assisting network node and the performing network node are comprised in a communications network.

The assisting network node comprises a determining circuit configured to determine at least two different resources for the first type of radio signal, wherein each resource is associated with a resource specific parameter, and wherein one of the at least two resources has a lower interference than the other of the at least two resources.

Further, the assisting network node comprises a transmitting circuit configured to transmit to the performing network node the at least two resource specific parameters. The at least two resource specific parameters indicate different transmit power levels of the first type of radio signal, and the different transmit power levels relate to the at least two different resources in two different time periods for the first type of radio signal. Thereby, the performing network node may perform the radio network operation task using the at least two resource specific parameters.

According to a seventh aspect of embodiments herein, the object is achieved by a method in a performing network node for performing a radio network operation task. The performing network node is comprised in a communications network.

The performing network node receives at least two resource specific parameters from an assisting network node comprised in the communications network. The at least two resource specific parameters indicate different transmit power levels of a first type of radio signal, and the different transmit power levels relate to at least two different resources in two different time periods for the first type of radio signal.

Further, the performing network node performs the radio network operation task using the at least two resource specific parameters.

According to an eight aspect of embodiments herein, the object is achieved by a performing network node for performing a radio network operation task. The performing network node is comprised in a communications network.

The performing network node comprises a receiving circuit configured to receive at least two resource specific parameters from an assisting network node comprised in the communications network. The at least two resource specific parameters indicate different transmit power levels of a first type of radio signal, and the different transmit power levels relate to at least two different resources in two different time periods for the first type of radio signal.

Further, the performing network node comprises a performing circuit configured to perform the radio network operation task using the at least two resource specific parameters.

Since the wireless device receives at least two resource specific parameters for a first type of radio signal, which at least two resource specific parameters indicate different transmit power levels of the first type of radio signal, wherein the different transmit power levels relate to two different resources in two different time periods for the first type of radio signal, and since the wireless device receives the signal transmitted at two different transmit power levels, the wireless device performs at least one measurement on the received first type of radio signal using the at least two resource specific parameters. Thereby, it is possible to use different power levels for these types of radio signals in different subframes, which for example provide for the control of the interference to other cells at certain time instances. This results in an improved performance in the communications network.

In one example, performing one measurement on the signal of a first type transmitted at two different power levels associated with two different resources may comprise performing the measurement selectively, e.g., only on the resources with the same transmit signal level. In another example, two different measurements may be performed on the two different resources associated with two different transmit power levels. In yet another example, the wireless device, being aware of that different transmit power levels are used and possibly also of the difference in the power levels of the two absolute levels, may adaptively configure its receiver to receive the signal of the first type in both resources and performing a measurement based on the signaled received in both resources, while meeting at least one pre-defined requirement. In yet, another example, a wireless device may adaptively use different receiver configurations for the different resources associated with the different transmit power levels of the signal of the first type received in these resources. The signal samples received in the two different resources may be further adaptively combined to obtain one measurement, wherein the combining is based on the indication that different transmit power levels are used or the absolute or relative transmit power levels of the received signals of the same first type.

An advantage of embodiments herein is thus that they provide for an improved control of interference.

Another advantage of embodiments herein is that the wireless device's performance is not degraded due to the wireless device's awareness of that the different power levels are used and/or absolute or relative power levels, allowing for adaptive adaption of the wireless device's receiver while performing the at least measurement. This is in contrast to the case when the wireless device is not aware of any resource-specific transmit power levels and to the cases when the wireless device either do not perform the adaptation or do perform the measurement blindly, i.e., without the ability to use the power level information to enhance the measurement performance.

A further advantage of embodiments herein is that they provide for the possibility for the wireless device to perform the adaptation of the wireless device's receiver, adaptively or selectively, based on the indication about using different transmit power levels or based on the actual absolute or relative transmit power levels information.

A yet further advantage of embodiments herein is that they provide for a tighter coordination between the communications network and the wireless device and thus a more efficient resource utilization in the network and in the wireless device is provided.

BRIEF DESCRIPTION OF THE DRAWINGS

Examples of embodiments herein are described in more detail with reference to attached drawings in which.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry, e.g., analog and/or discrete logic gates interconnected to perform a specialized function, ASICs, PLAs, etc., and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
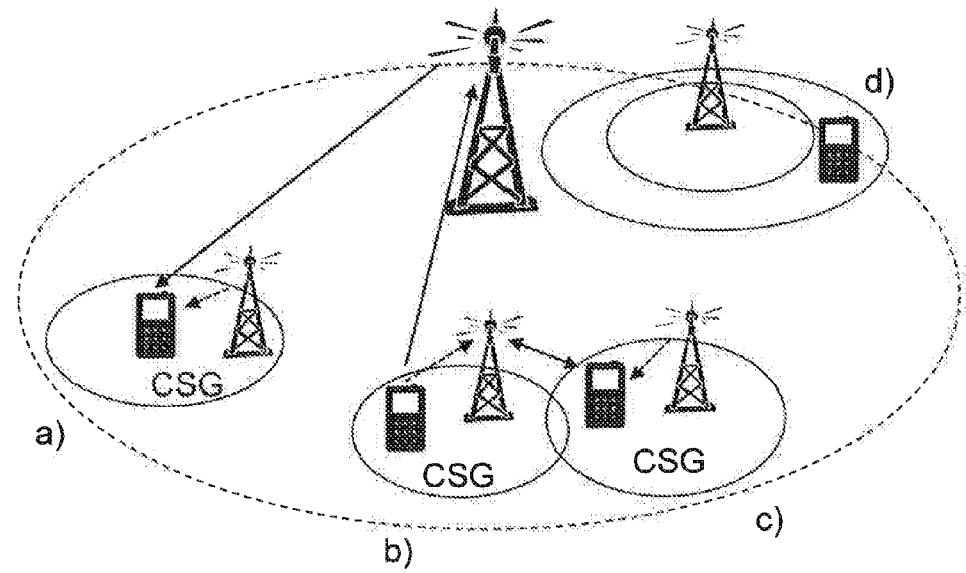
FIG. 1 schematically illustrates various interference scenarios in heterogeneous deployments.
Figure 2:
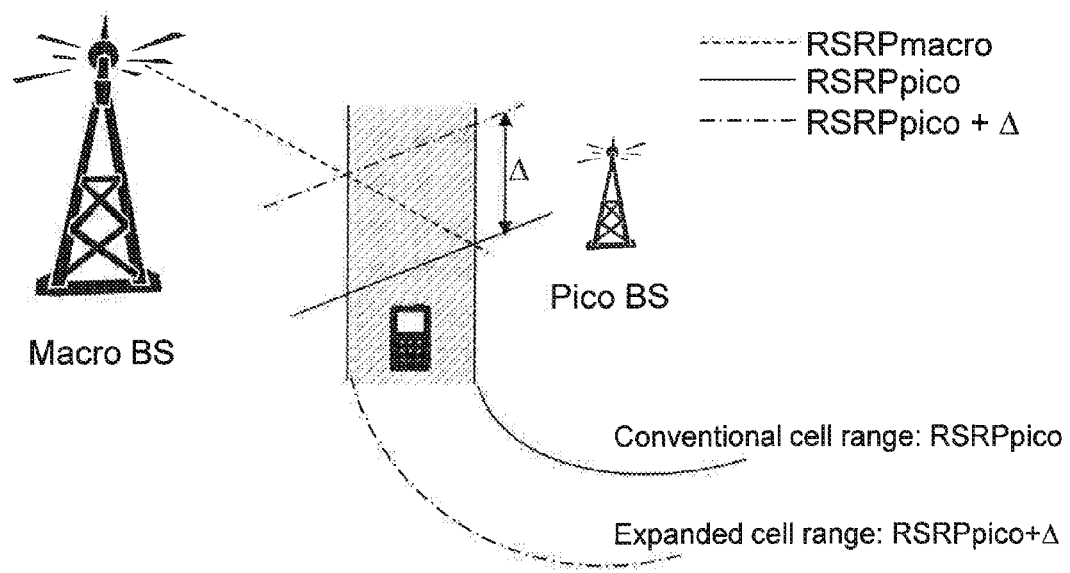
FIG. 2 schematically illustrates cell range expansion in heterogeneous networks.
Figure 3:
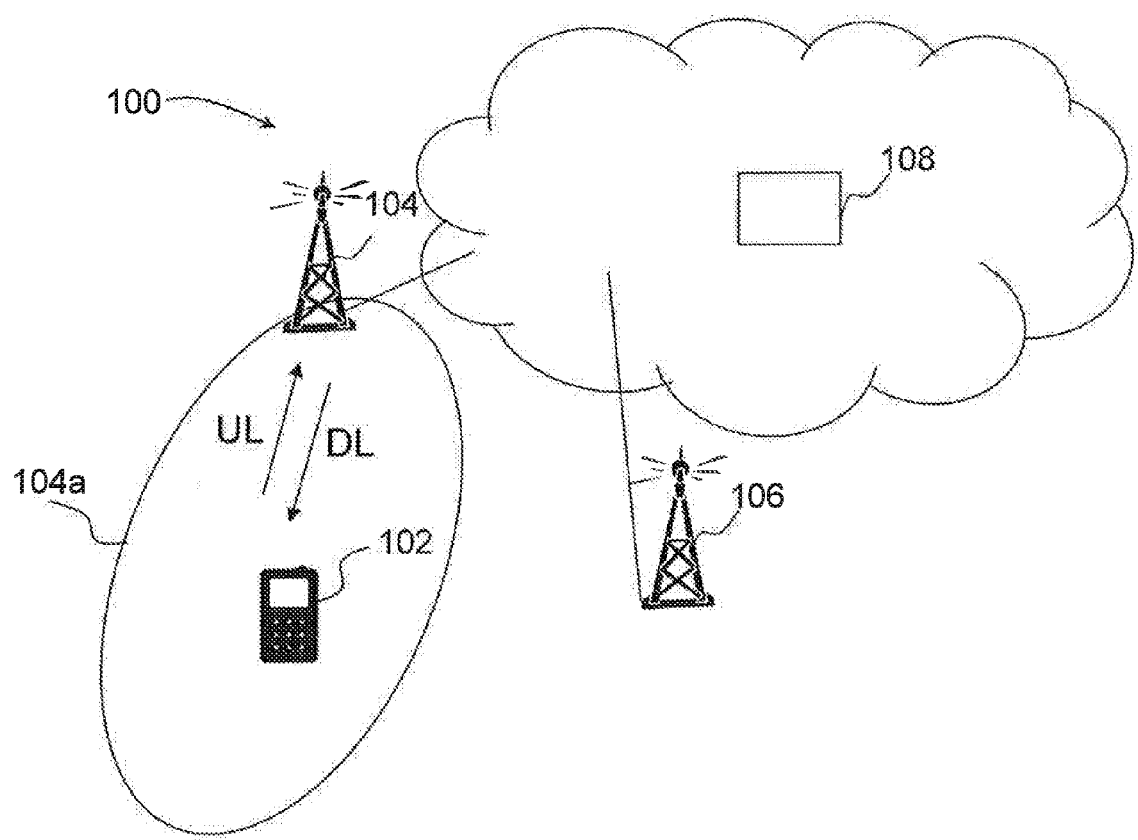
FIG. 3 is a schematic block diagram illustrating embodiments of a communications system.

FIG. 3 schematically illustrates a communications network 100. The radio communications network 100 may be a 3GPP communications system or a non-3GPP communications system. The radio communications network 100 may comprises one or more of radio communications networks (not shown). Each radio communications network may be configured to support one or more Radio Access Technologies (RATs). Further, the one or more radio communications networks may be configured to support different RATs. Some examples of RATs are GSM, WCDMA, and LTE.

The radio communications network 100 comprises a wireless device 102 and a first network node 104. The first network node 104 may be a first radio network node 104 configured to serve the wireless device 102. The first radio network node 104 may provide coverage over a geographical area 104a that sometimes is referred to as a cell.

The wireless device 102 is located within the geographical area 104a and is served by the first radio network node 104. Further, the wireless device 102 transmits data over a radio interface to the first radio network node 104 in an uplink (UL) transmission and the first radio network node 104 transmits data to the wireless device 102 in a downlink (DL) transmission.

The wireless device 102 may be e.g. a User equipment (UE), such as a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The wireless device 102 may further be configured for use in both a 3GPP network and in a non-3GPP network.

The first radio network node 104 may be a base station such as an eNB, an eNodeB, Node B or a Home Node B, a Home eNode B, a radio network controller, a base station controller, an access point, a relay node which may be fixed or movable, a donor node serving a relay, a GSM/EDGE radio base station, a Multi-Standard Radio (MSR) base station or any other network unit capable to serve a wireless device or another network node comprised in the cellular communications network 100.

The radio communications network 100 may further comprise and a second network node 106, and a third network node 108.

The second network node 106 may be a base station such as an eNB, an eNodeB, Node B or a Home Node B, a Home eNode B, a Radio Network Controller (RNC), a Base Station Controller (BSC), an access point, a relay node which may be fixed or movable, a donor node serving a relay, a GSM/EDGE radio base station, a Multi-Standard Radio (MSR) base station or any other network unit capable to serve a wireless device or another network node comprised in the cellular communications network 100.

Further, the third network node 108 may for example be a Radio Network Controller (RNC), a Base Station Controller (BSC), a positioning node, or a Self-Optimizing/Organizing (SON) node.

In some embodiments that will be described herein, reference is made to an assisting network node 104,106,108 configured to assist the wireless device 102 in performing a measurement. In such embodiments, the assisting network node 104,106,108 may be a first assisting network node 104 corresponding to the first network node 104, or a second assisting network node 106,108 corresponding to the second network node 106 or the third network node 108.

Further, in some other embodiments that will be described herein, reference is made to an assisting network node 104, 108 configured to assist a performing network node 106,108 in performing a radio network operation task. In such embodiments, the assisting network node 104,108 may be the first network node 104 or the third network node 108. Further, the performing network node 106,108 may be the second network node 106 or another third network node 108.

Although the description sometimes is given for UE 102, it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node, e.g., an LMU or a femto base station or a small base station using the terminal technology. A UE herein may comprise a UE (in its general sense) capable of operating or at least performing measurements in one or more frequencies, carrier frequencies, component carriers or frequency bands. It may be a "UE" operating in single- or multi-RAT or multi-standard mode, e.g., an example dual-mode UE may operate with any one or combination of WiFi and LTE.

A cell is associated with a radio node, where a radio node or radio network node or eNodeB used interchangeably in the description, comprises in a general sense any node transmitting radio signals in DL and/or receiving radio signals in UL. Some examples of radio network nodes are eNodeB, Node B, RNC, macro/micro/pico radio base station, home eNodeB, relay, repeater, sensor, transmitting-only radio nodes or receiving-only radio nodes. A radio network node herein may comprise a radio node operating or at least performing measurements in one or more frequencies, carrier frequencies or frequency bands. It may be a radio node capable of CA. It may also be a single- or multi-RAT or multi-standard node, e.g., using the same or different base band modules for different RATs.

Multiple serving cells are possible with carrier aggregation (CA), so "a serving cell" is in general used throughout the description for CA and non-CA systems. With CA, primary cell (PCell) is one example of a serving cell, and another example is a secondary cell (SCell). For a UE in RRC_CONNECTED not configured with CA there is only one serving cell comprising the primary cell. For a UE in RRC_CONNECTED configured with CA the term 'serving cells' is used to denote the set of one or more cells comprising the primary cell and all secondary cells.

A radio node may also be a radio node which does not create its own cell, but still transmitting some DL signals or receiving some signals in UL.

A subframe may be any time interval or time slot, which may be pre-defined. An example is an LTE subframe.

The term "centralized network management node" or "coordinating node" is a network node, which may also be a radio network node, which coordinates radio resources with one or more radio network nodes and/or UEs. Some examples of the coordinating node are network monitoring and configuration node, OSS node, O&M, MDT node, SON node, positioning node, a gateway node such as Packet Data Network Gateway (P-GW) or Serving Gateway (S-GW) network node or femto gateway node, a macro node coordinating smaller radio nodes associated with it, etc.

The signaling described is either via direct links or logical links, e.g. via higher layer protocols and/or via one or more network nodes. For example, signaling from a coordinating node may pass another network node, e.g., a radio node.

The example embodiments are not limited to LTE, but may apply to any Radio Access Network (RAN), single- or multi-RAT. Some other RAT examples are LTE-Advanced, UMTS, GSM, cdma2000, WiMAX, and WiFi.

Embodiments described herein may be considered as independent embodiments or may be considered in any combination with each other to describe non-limiting examples.

Though the description is provided for reference signals, the technology may also apply for physical signals in general, unless otherwise stated. For example, synchronization signals may be signaled with reduced or zero power.

Figure 4:
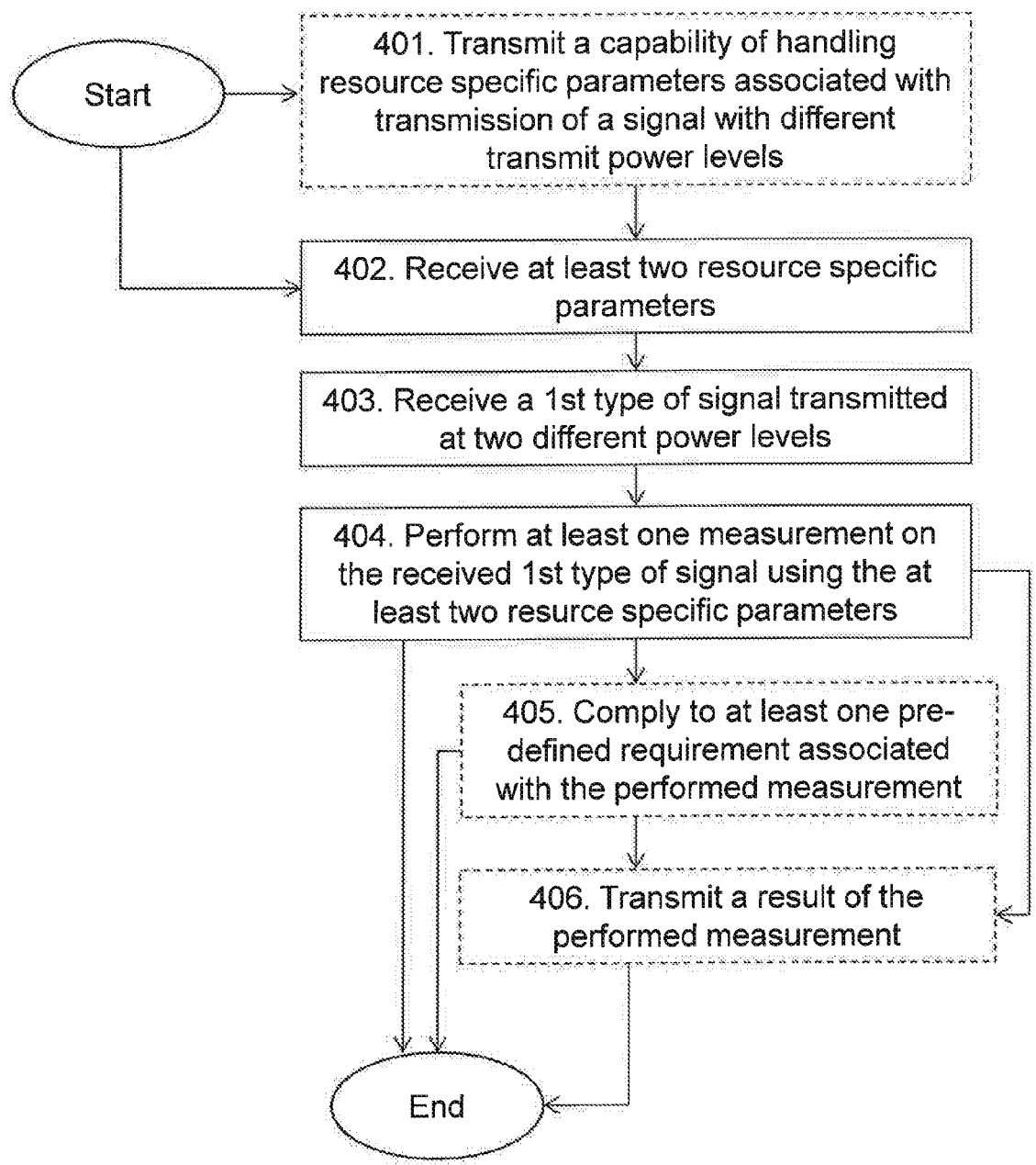
FIG. 4 is a flow chart depicting embodiments of a method in a wireless device.

A method in a wireless device 102 for performing a measurement on a first type of radio signal will now be described with reference to FIG. 4. As previously mentioned, the wireless device 102 is comprised in the communications network 100.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

The method comprises the following actions, which do not have to be performed in the order stated below, but may be taken in any suitable order. Further, actions may be combined.

Action 401

In some embodiments, the wireless device 102 transmits a capability of handling resource specific parameters associated with the transmission of the first type of radio signal with different transmit power levels in different time periods for performing the at least one measurement. The wireless device 102 may transmit the capability to an assisting network node 104,106,108 in order to let the assisting network node 104, 106,108 get knowledge about the capability. The assisting network node 104,106,108 may be a first assisting network node 104 or a second assisting network node 106,108, Further, the wireless device 102 may transmit the capability proactively, on request or at an event such as at handover or connection set up.

Furthermore, the wireless device 102 may transmit the capability for a specific signal type or subset of signal types or for all signal types.

Action 402

The wireless device 102 receives at least two resource specific parameters for the first type of radio signal. The at least two resource specific parameters indicate different transmit power levels of the first type of radio signal, and the different transmit power levels relate to two different resources in two different time periods for the first type of radio signal. The two different resources may be two different time and/or frequency resources.

The wireless device 102 may receive the at least two resource specific parameters for the first type of radio signal from the assisting network node 104, 106,108.

In some embodiments, the wireless device 102 receives a first resource specific transmit power parameter that is associated with the transmit power of the first type of radio signal transmitted in a first resource in a first time period. Further, the wireless device 102 may receive a second resource specific transmit power parameter that is associated with the transmit power of the first type of radio signal transmitted in a second resource in a second time period.

Furthermore, one of the two resources may have a lower interference than the other of the two resources.

In some embodiments, the at least two resource specific parameters may be received from a first assisting network node 104 serving the wireless device 102 and comprised in the communications network 100 or from a second assisting network node 106,108 comprised in the communications network 100. In such embodiments, the first assisting network node 104 may be an eNode B, a base station, a relay node, or a donor node, and the second assisting network node 106,108 may be an eNode B, a base station, a relay node, a donor node, a RNC, a BSC, a positioning node or a SON node.

Action 403

The wireless device 102 receives a first type of radio signal transmitted at two different transmit power levels. The first type of radio signal may be transmitted by the assisting network node 104,106,108.

Action 404

The wireless device 102 performs the at least one measurement on the received first type of radio signal using the at least two resource specific parameters.

In some embodiments, the wireless device 102 performs at least one of a mobility measurement, a positioning measurement; a timing measurement; a measurement for power control; a path loss measurement; a measurement for scheduling; a Channel State Information (CSI) measurement; a measurement for demodulation or reception of user data or control information; paging reception; Broadcast Channel (BCH) reception; Physical Downlink Shared Channel (PDSCH) reception; control channel reception; Physical Multicast Channel (PMCH) reception; a positioning measurement on a Positioning Reference Signal (PRS), or a Cell-specific Reference Signal (CRS); a cell identification measurement involving a measurement on a synchronization signal; radio link monitoring; a measurement of path loss; a channel estimation; and a measurement of Radio Resource Management (RRM).

The control channel reception may be reception of Physical Downlink Control Channel (PDCCH), Physical Control Format Indicator Channel (PCFICH), or Physical Hybrid ARQ Indicator Channel (PHICH).

Action 405

The wireless device 102 may comply to at least one pre-defined requirement associated with the performed measurement on the first type of radio signal using the at least two resource specific parameters. The pre-defined requirement may be at least one of: cell identification time based on the received first type of signal transmitted at different transmit power levels in different resources, radio link monitoring requirement, measurement or evaluation period of measurement, measurement accuracy of the measurement or reporting range of the measurement, receiver dynamic range requirement, adaptively using two dynamic range configurations.

Action 406

The wireless device 102 may transmit a result of the performed measurement to the assisting network node 104,106, 108, such as to the first assisting network node 104 or to the second assisting network node 106,108.

Figure 5:
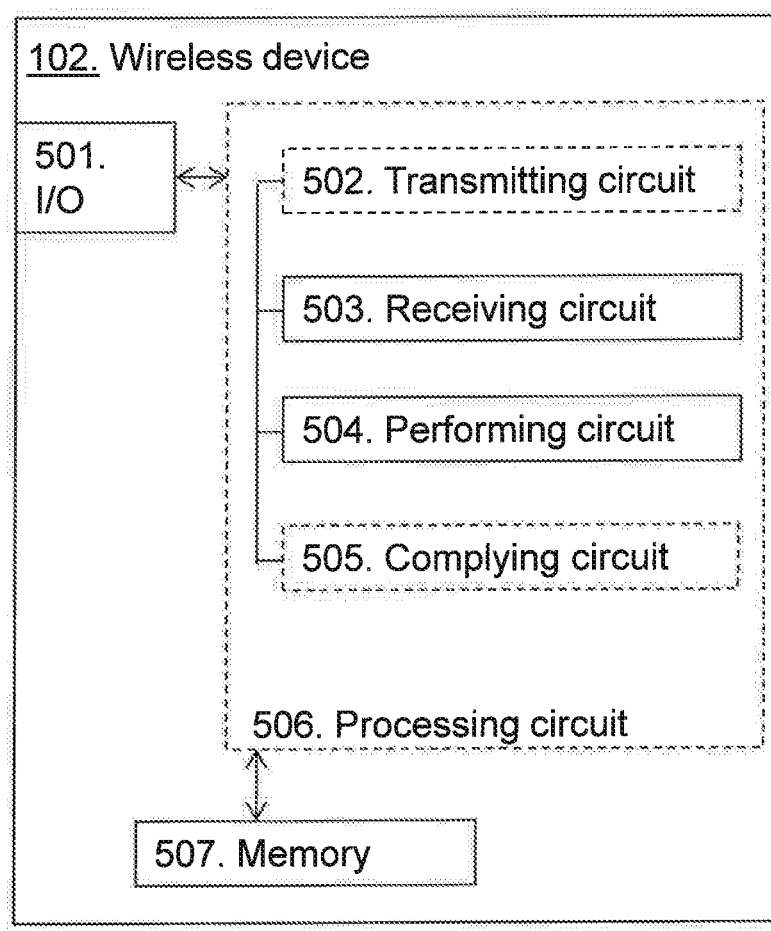
FIG. 5 is a schematic block diagram illustrating embodiments of a wireless device.

To perform the method actions in the wireless device 102 described above in relation to FIG. 4, the wireless device 102 may comprise the following arrangement depicted in FIG. 5.

As previously mentioned, the wireless device 102 is comprised in the communications network 100.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

The wireless device 102 comprises an input and output (I/O) interface 501 configured to function as an interface for communication in the communication network 100. The communication may for example be communication with another wireless device 102 and/or with a network node 104, 106,108.

In some embodiments, the wireless device 102 comprises further a transmitting circuit 502 configured to transmit a result of a performed measurement to an assisting network node 104,106,108 such as to the first assisting network node 104 or to the second assisting network node 106,108.

The transmitting circuit 502 may further be configured to transmit, to the first assisting network node 104 or to the second assisting network node 106,108, a capability of handling resource specific parameters associated with the transmission of the first type of radio signal with different transmit power levels in different time periods for performing the at least one measurement.

In some embodiments, the transmitting circuit 502 is configured to transmit the capability proactively, on request or at an event such as at handover or connection set up.

Further, the transmitting circuit 502 may be configured to transmit the capability for a specific signal type or subset of signal types or for all signal types.

The wireless device 102 comprises a receiving circuit 503 configured to receive at least two resource specific parameters for the first type of radio signal. The at least two resource specific parameters indicate different transmit power levels of the first type of radio signal, which different transmit power levels relate to two different resources in two different time periods for the first type of radio signal. The two different resources may be two different time and/or frequency resources.

Further, the receiving circuit 503 is configured receive a first type of radio signal transmitted at the two different transmit power levels.

The receiving circuit 503 may be configured to receive the at least two resource specific parameters and/or the first type of radio signal from the first assisting network node 104 serving the wireless device 102 and comprised in the communications network 100, or from the second assisting network node 106,108 comprised in the communications network 100. The first assisting network node 104 may be an eNode B, a base station, a relay node, or a donor node, and the second assisting network node 106,108 may be an eNode B, a base station, a relay node, a donor node, a RNC, a BSC, a positioning node or a SON node.

Further, the receiving circuit 503 may be configured to receive a first resource specific transmit power parameter that is associated with the transmit power of the first type of radio signal transmitted in a first resource in a first time period, and configured to receive a second resource specific transmit power parameter that is associated with the transmit power of the first type of radio signal transmitted in a second resource in a second time period.

In some embodiments, one of the at least two resources has a lower interference than the other of the at least two resources.

The wireless device 102 comprises a performing circuit 504 configured to perform at least one measurement on the received first type of radio signal using the at least two resource specific parameters.

In some embodiments, the performing circuit 504 is configured to perform at least one of a at least one of a mobility measurement, a positioning measurement; a timing measurement; a measurement for power control; a path loss measurement; a measurement for scheduling; a Channel State Information (CSI) measurement; a measurement for demodulation or reception of user data or control information; paging reception; Broadcast Channel (BCH) reception; Physical Downlink Shared Channel (PDSCH) reception; control channel reception; Physical Multicast Channel (PMCH) reception; a positioning measurement on a Positioning Reference Signal (PRS), or a Cell-specific Reference Signal (CRS); a cell identification measurement involving a measurement on a synchronization signal; radio link monitoring; a measurement of path loss; a channel estimation; and a measurement of Radio Resource Management (RRM).

The control channel reception may be reception of Physical Downlink Control Channel (PDCCH), Physical Control Format Indicator Channel (PCFICH), or Physical Hybrid ARQ Indicator Channel (PHICH).

The wireless device 102 may further comprise a complying circuit 505 configured to comply with at least one pre-defined requirement associated with the performed measurement on the first type of radio signal using the at least two resource specific parameters. The pre-defined requirement may be at least one of: cell identification time based on the received first type of signal transmitted at different transmit power levels in different resources, radio link monitoring requirement, measurement or evaluation period of measurement, measurement accuracy of the measurement or reporting range of the measurement, receiver dynamic range requirement, adaptively using two dynamic range configurations.

Embodiments herein for performing a measurement on a first type of radio signal may be implemented through one or more processors, such as a processing circuit 506 in the wireless device 102 depicted in FIG. 5, together with computer program code for performing the functions and/or method actions of embodiments herein.

It should be understood that one or more of the circuits comprised in the wireless device 102 described above may be integrated with each other to form an integrated circuit.

The wireless device 102 may further comprise a memory 507. The memory may comprise one or more memory units and may be used to store for example data such as thresholds, predefined or pre-set information, etc.

Figure 6:
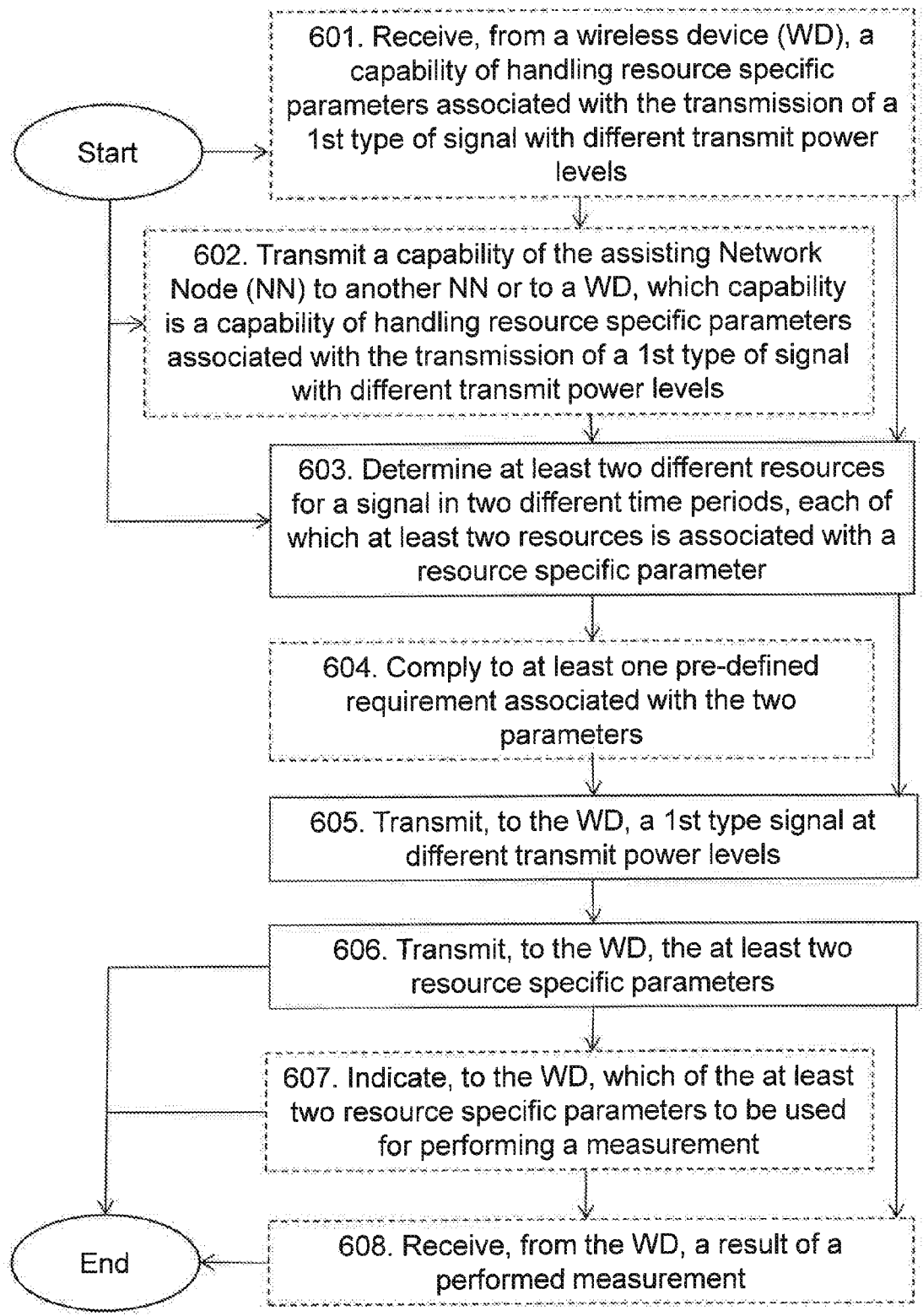
FIG. 6 is a flow chart depicting embodiments of a method in an assisting network node.

A method in an assisting network node 104,106,108 for assisting a wireless device 102 in performing a measurement on a first type of radio signal will now be described with reference to FIG. 6. As previously mentioned, the assisting network node 104,106,108 and the wireless device 102 are comprised in the communications network 100.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS)

or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

The method comprises the following actions, which do not have to be performed in the order stated below, but may be taken in any suitable order. Further, actions may be combined.

Action 601

The assisting network node 104,106,108 may receive, from the wireless device 102, a capability of handling resource specific parameters associated with the transmission of the first type of radio signal with different transmit power levels in different time periods for performing the at least one measurement.

In some embodiments, the assisting network node 104, 106,108 receives the capability proactively, on request or at an event such as at handover or initial set up.

Further, the assisting network node 104,106,108 may receive the capability for a specific signal type or subset of signal types or for all signal types.

Action 602

The assisting network node 104,106,108 may further transmit a capability of the assisting network node 104,106,108. The capability may be a capability of handling resource specific parameters associated with the transmission of the radio signal with different power levels in different time periods. The assisting network node 104,106,108 may transmit the capability to a first assisting network node 104, a second assisting network node 106,108 and/or to the wireless device 102. The first assisting network node 104 may be an eNode B, a base station, a relay node, or a donor node, and the second assisting network node 106,108 may be an eNode B, a base station, a relay node, a donor node, a RNC, a BSC, a positioning node or a SON node.

Action 603

The assisting network node 104,106,108 determines at least two different resources for the first type of radio signal in two different time periods, each of which at least two resources is associated with a resource specific parameter. The two different resources may be two different time and/or frequency resources.

In some embodiments, one of the at least two resources has a lower interference than the other of the at least two resources.

Action 604

The assisting network node 104,106,108 may further comply with at least one pre-defined requirement associated with the two parameters related for the two different power levels. The pre-defined requirement may be at least one of: transient periods, power adjustment accuracy, increased dynamic power ranges, more than one dynamic range configured by the assisting network node 104,106,108.

Action 605

The assisting network node 104,106,108 further transmits the first type of radio signal at different transmit power levels to the wireless device 102.

Action 606

The assisting network node 104,106,108 transmits the at least two resource specific parameters that indicate different transmit power levels of the first type of radio signal associated with two different time periods. The assisting network node 104,106,108 transmits the at least two resource specific parameters to the wireless device 102. The different transmit power levels relate to the two different resources. Thereby, the wireless device 102 may perform at least one measurement on the received first type of radio signal using the at least two resource specific parameters.

In some embodiments, the assisting network node 104, 106,108 transmits a first resource specific transmit power parameter that is associated with the transmit power of the first type of radio signal transmitted in a first resource in a first time period, and a second resource specific transmit power parameter that is associated with the transmit power of the first type of radio signal transmitted in a second resource in a second time period.

The at least two resource specific parameters for the first type of radio signal may be expressed in terms of one of the following: absolute values; at least one of the at least two resource specific parameters is expressed in terms of a relative value with respect to the other one of the at least two resource specific parameter; and at least one of the at least two resource specific parameters is expressed in terms of a relative value with respect to a reference value.

Action 607

The assisting network node 104,106,108 may further indicate to the wireless device 102 which of the at least two resource specific parameters that is/are to be used for performing the at least one measurement on the first type of radio signal.

Action 608

The assisting network node 104,106,108 may further receive from the wireless device 102, a result of the performed at least one measurement on the first type of radio signal.

Figure 7:
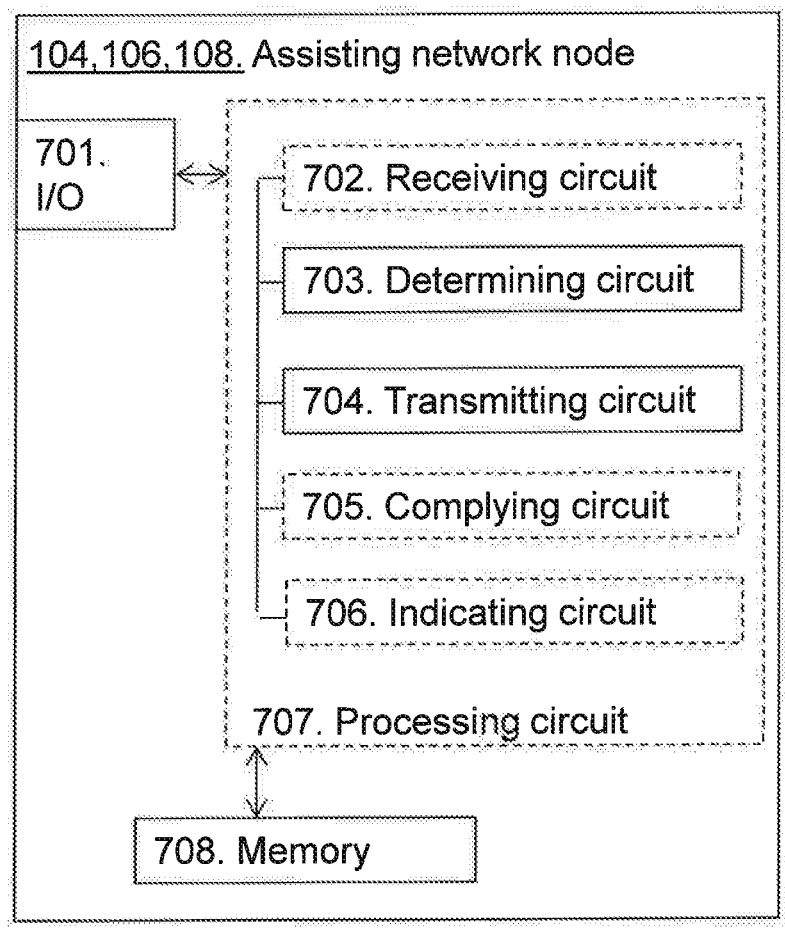
FIG. 7 is a schematic block diagram illustrating embodiments of an assisting network node.

To perform the method actions in the assisting network node 104,106,108 described above in relation to FIG. 6, the assisting network node 104,106,108 may comprise the following arrangement depicted in FIG. 7. As previously mentioned, the assisting network node 104,106,108 and the wireless device 102 are comprised in the communications network 100.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

The assisting network node 104,106,108 comprises an input and output (I/O) interface 701 configured to function as an interface for communication in the communication network 100. The communication may for example be communication with a wireless device 102 and/or with another network node 104,106,108.

The assisting network node 104,106,108 may further comprise a receiving circuit 702 configured to receive, from the wireless device 102, a result of the performed at least one measurement on the first type of radio signal.

The receiving circuit 702 may further be configured to receive, from the wireless device 102, a capability of handling resource specific parameters associated with the transmission of the first type of radio signal with different power levels in different time periods for performing at least one measurement on the first type of radio signal.

In some embodiments, the receiving circuit 702 is configured to receive the capability proactively, on request or at an event such as at handover or initial set up. Further, the receiving circuit 702 may be configured to receive the capability for a specific signal type or subset of signal types or for all signal types.

The assisting network node 104,106,108 comprises a determining circuit 703 configured to determine at least two different resources for the first type of radio signal in two different time periods, each of which at least two resources is associated with a resource specific parameter. The two different resources may be two different time and/or frequency resources.

In some embodiments, one of the at least two resources has a lower interference than the other of the at least two resources.

Further, the at least two resource specific parameters for the first type of radio signal may be expressed in terms of one of the following absolute values; at least one of the at least two resource specific parameters is expressed in terms of a relative value with respect to the other one of the at least two resource specific parameter; and at least one of the at least two resource specific parameters is expressed in terms of a relative value with respect to a reference value.

Further, the assisting network node 104,106,108 comprises a transmitting circuit 704 configured to transmit, to the wireless device 102, a first type of radio signal at different transmit power levels. The transmitting circuit 704 is further configured to transmit, to the wireless device 102, the at least two resource specific parameters that indicate different transmit power levels of the first type of radio signal associated with two different time periods. The different transmit power levels relate to the two different resources. Upon reception of the at least two resource specific parameters, the wireless device 102 may perform at least one measurement on the first type of radio signal using the at least two resource specific parameters.

In some embodiments, the transmitting circuit 704 is further configured to transmit a first resource specific transmit power parameter that is associated with the transmit power of the first type of radio signal transmitted in a first resource in a first time period; and to transmit a second resource specific transmit power parameter that is associated with the transmit power of the first type of radio signal transmitted in a second resource in a second time period.

The transmitting circuit 704 may further be configured to transmit a capability of the assisting network node 104,106, 108. The capability may be a capability of handling resource specific parameters associated with the transmission of the first type of radio signal with different power levels in different time periods to a first assisting network node 104, a second assisting network node 106,108 and/or to the wireless device 102. The first assisting network node 104 may be an eNode B, a base station, a relay node, or a donor node, and the second assisting network node 106,108 may be an eNode B, a base station, a relay node, a donor node, a RNC, a BSC, a positioning node or a SON node.

The assisting network node 104,106,108 may further comprise an indicating circuit 706 configured to indicate to the wireless device 102 which of the at least two resource specific parameters is/are to be used for performing the at least one measurement on the first type of radio signal.

In some embodiments, the assisting network node 104, 106,108 further comprises a complying circuit 705 configured to comply with at least one pre-defined requirement associated with the two parameters related for the two different power levels. The pre-defined requirement may comprise at least one of: transient periods, power adjustment accuracy, increased dynamic power ranges, more than one dynamic range configured by the assisting network node 104,106,108.

Embodiments herein for assisting a wireless device 102 in performing a measurement on a first type of radio signal may be implemented through one or more processors, such as a processing circuit 707 in the assisting network node 104,106, 108 depicted in FIG. 7, together with computer program code for performing the functions and/or method actions of embodiments herein.

It should be understood that one or more of the circuits comprised in the assisting network node 104,106,108 described above may be integrated with each other to form an integrated circuit.

The assisting network node 104,106,108 may further comprise a memory 708. The memory may comprise one or more memory units and may be used to store for example data such as thresholds, predefined or pre-set information, etc.

Figure 8:
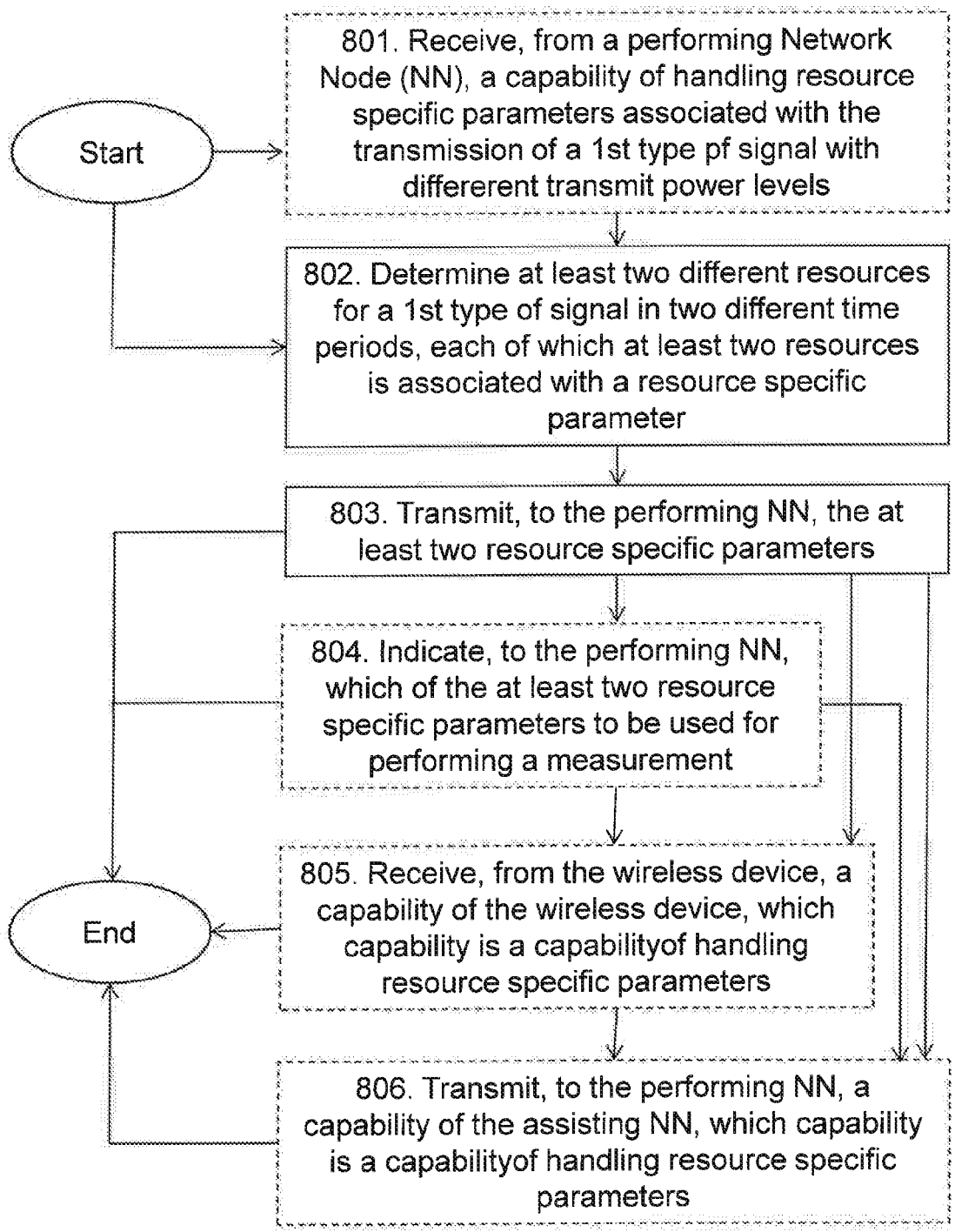
FIG. 8 is a flow chart depicting embodiments of a method in an assisting network node.

A method in an assisting network node 104,108 for assisting a performing network node 106,108 in performing a radio network operation task will now be described with reference to FIG. 8. As previously mentioned, the assisting network node 104,108 and the performing network node 106,108 are comprised in the communications network 100.

The method comprises the following actions, which do not have to be performed in the order stated below, but may be taken in any suitable order. Further, actions may be combined.

Action 801

The assisting network node 104,108 may receive a capability of the performing network node 106,108 from the performing network node 106,108. The capability may be a capability of handling resource specific parameters associated with the transmission of a first type of radio signal with different transmit power levels in different time periods for performing the radio network operation task.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

Action 802

The assisting network node 104,108 determines at least two different resources for a first type of radio signal, wherein each resource is associated with a resource specific parameter. Further, one of the at least two resources has a lower interference than the other of the at least two resources. The at least two resources may be at least two different time and/or frequency resources.

In some embodiments, the at least two resource specific parameters are expressed in terms of one of the following: absolute values; at least one of the at least two resource specific parameters is expressed in terms of a relative value with respect to the other one of the at least two resource specific parameters; and at least one of the at least two resource specific parameters is expressed in terms of a relative value with respect to a reference value.

Action 803

The assisting network node 104,108 transmits the at least two resource specific parameters to the performing network node 106,108. The at least two resource specific parameters indicate different transmit power levels of the first type of radio signal. Further, the different transmit power levels relate to the at least two different resources in two different time periods for the first type of radio signal. Thereby, the second network node 106,108 may perform the radio network operation task using the at least two resource specific parameters.

In some embodiments, the assisting network node 104,108 transmits a first resource specific transmit power parameter that is associated with the transmit power of the first type of radio signal transmitted in a first resource in a first period of time and a second resource specific transmit power parameter that is associated with the transmit power of the first type of radio signal transmitted in a second resource in a second period of time.

In some embodiments, the radio network operation task may be a task selected from the group comprising: interference estimation, interference prediction, path loss estimation, uplink power control, building up assistance data, informing a wireless device 102 of a transmit power of the assisting network node 104,108, adjusting at least one transmit power related to the performing network node 106,108, configuring at least one signal transmitted by the performing network node 106,108, configuring at least one measurement pattern in the performing network node 106,108, configuring at least one measurement pattern for performing measurement in a cell associated with the performing network node 106,108, and/or adjusting a parameter value with regard to the parameter value used in one or more neighboring network nodes 104,108.

In such embodiments, the first assisting network node 104, 108 may be a first network node 104 such as an eNode B, a base station, a relay node, or a donor node, and the performing network node 106,108 may be an eNode B, a base station, a relay node, a donor node, a RNC, a BSC, a positioning node or a SON node.

In some other embodiments, the radio network operation task is a task selected from the group comprising: network planning, management of parameters used in the communications network 100, optimization of parameters used in the communications network 100, modify or recommend a time period of the first type of radio signal, recommend updates for the time period, recommend updates of a frequency-related configuration, building up positioning assistance data, and/or building up assistance data intended to support measurements.

In such embodiments, the assisting network node 104,108 may be an eNode B, a base station, a relay node, or a donor node, a RNC, a BSC, a positioning node or a SON node, and the performing network node 106,108 may be a SON node, a MDT node, an OSS node, an O&M node, a network monitoring node, a coordinating node, or a positioning node.

Action 804

The assisting network node 104,108 may indicate to the performing network node 106 which of the at least two resource specific parameters is/are to be used for performing the radio network operation task.

Action 805

The assisting network node 104,108 may receive a capability associated with a wireless device 102. The capability may be received from the wireless device 102. The capability may be a capability of handling resource specific parameters associated with the transmission of the first type of radio signal with different power levels in different time periods for performing the radio network operation task.

Action 806

In some embodiments, the assisting network node 104,108 transmits a capability associated with the assisting network node 104,108 to the performing network node 106,108. The capability may a capability of handling resource specific parameters associated with the transmission of the first type of radio signal with different power levels in different time periods.

Figure 9:
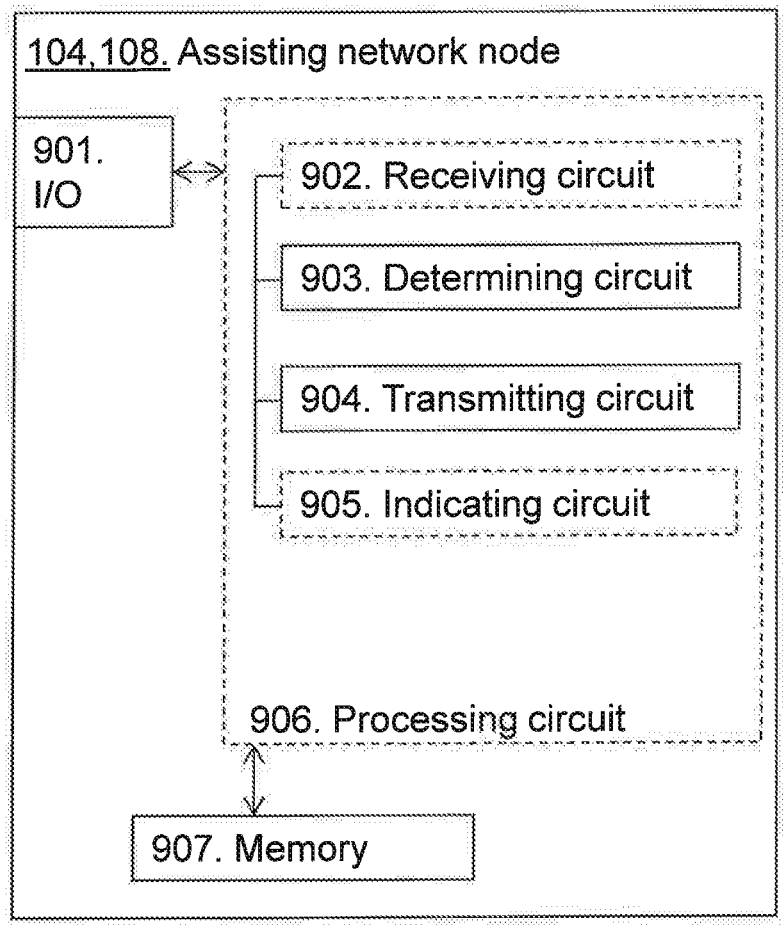
FIG. 9 is a schematic block diagram illustrating embodiments of an assisting network node.

To perform the method actions in the assisting network node 104,108 described above in relation to FIG. 8, the assisting network node 104,108 may comprise the following arrangement depicted in FIG. 9. As previously mentioned, the assisting network node 104,108 and the performing network node 106,108 are comprised in the communications network 100.

The assisting network node 104,108 comprises an input and output (I/O) interface 901 configured to function as an interface for communication in the communication network 100. The communication may for example be communication with a wireless device 102 and/or with another network node 104,106,108.

In some embodiments, the assisting network node 104,108 comprises a receiving circuit 902 configured to receive, from the performing network node 106,108, a capability of the performing network node 106,108. The capability may be a capability of handling resource specific parameters associated with the transmission of a radio signal with different power levels in different time periods for performing the radio network operation task.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

Further, the receiving circuit 902 may be configured to receive, from a wireless device 102, a capability associated with the wireless device 102. The capability may be a capability of handling resource specific parameters associated with the transmission of the radio signal with different power levels in different time periods for performing the radio network operation task.

The assisting network node 104,108 comprises a determining circuit 903 configured to determine at least two different resources for a first type of radio signal. The at least two different resource may be at least two different time and/or frequency resources. Each resource is associated with a resource specific parameter, and one of the at least two resources has a lower interference than the other of the at least two resources.

In some embodiments, the at least two resource specific parameters are expressed in terms of one of the following: absolute values; at least one of the at least two resource specific parameters is expressed in terms of a relative value with respect to the other one of the at least two resource specific parameters; and at least one of the at least two resource specific parameters is expressed in terms of a relative value with respect to a reference value.

The assisting network node 104,108 comprises further a transmitting circuit 904 configured to transmit the at least two resource specific parameters to the performing network node 106,108. The at least two resource specific parameters may indicate different transmit power levels of the first type of radio signal. Further, the different transmit power levels may relate to the at least two different resources in two different time periods for the first type of radio signal. Thereby, the performing network node 106,108 may perform the radio network operation task using the at least two resource specific parameters.

In some embodiments, the radio network operation task is a task selected from the group comprising: interference estimation, interference prediction, path loss estimation, uplink power control, building up assistance data, informing a wireless device 102 of a transmit power of the assisting network node 104,108, adjusting at least one transmit power related to the performing network node 106,108, configuring at least one signal transmitted by the performing network node 106, 108, configuring at least one measurement pattern in the performing network node 106,108, configuring at least one measurement pattern for performing measurement in a cell associated with the performing network node 106,108, and/or adjusting a parameter value with regard to the parameter value used in one or more neighboring network nodes 104, 108.

In such embodiments, the assisting network node 104,108 is a first network node 104 such as an eNode B, a base station, a relay node, or a donor node, and wherein the performing network node 106,108 is an eNode B, a base station, a relay node, a donor node, a RNC, a BSC, a positioning node or a SON node.

In some other embodiments, the radio network operation task is a task selected from the group comprising: network planning, management of parameters used in the communications network 100, optimization of parameters used in the communications network 100, modify or recommend a time period of the first type of radio signal, recommend updates for the time period, recommend updates of a frequency-related configuration, building up positioning assistance data, and/or building up assistance data intended to support measurements.

In such embodiments, the assisting network node 104,108 is an eNode B, a base station, a relay node, or a donor node, a RNC, a BSC, a positioning node or a SON node, and the performing network node 106,108 is a SON node, a MDT node, an OSS node, an O&M node, a network monitoring node, a coordinating node, or a positioning node.

The transmitting circuit 904 may further be configured to transmit a first resource specific transmit power parameter that is associated with the transmit power of the first type of radio signal transmitted in a first resource in a first period of time, and a second resource specific transmit power parameter that is associated with the transmit power of the first type of radio signal transmitted in a second resource in a second period of time.

The transmitting circuit 904 may further be configured to transmit, to the performing network node 106,108, a capability associated with the assisting network node 104,108. The capability may be a capability of handling resource specific parameters associated with the transmission of the first type of radio signal with different power levels in different time periods.

In some embodiments, the assisting network node 104,108 comprises an indicating circuit 905 configured to indicate to performing network node 106,108 which of the at least two resource specific parameters is/are to be used for performing the radio network operation task.

Embodiments herein for assisting a performing network node 106,108 in performing a radio network operation task may be implemented through one or more processors, such as a processing circuit 906 in the assisting network node 104, 106 depicted in FIG. 9, together with computer program code for performing the functions and/or method actions of embodiments herein.

It should be understood that one or more of the circuits comprised in the assisting network node 104,108 described above may be integrated with each other to form an integrated circuit.

The assisting network node 104,108 may further comprise a memory 907. The memory may comprise one or more memory units and may be used to store for example data such as thresholds, predefined or pre-set information, etc.

Figure 10:
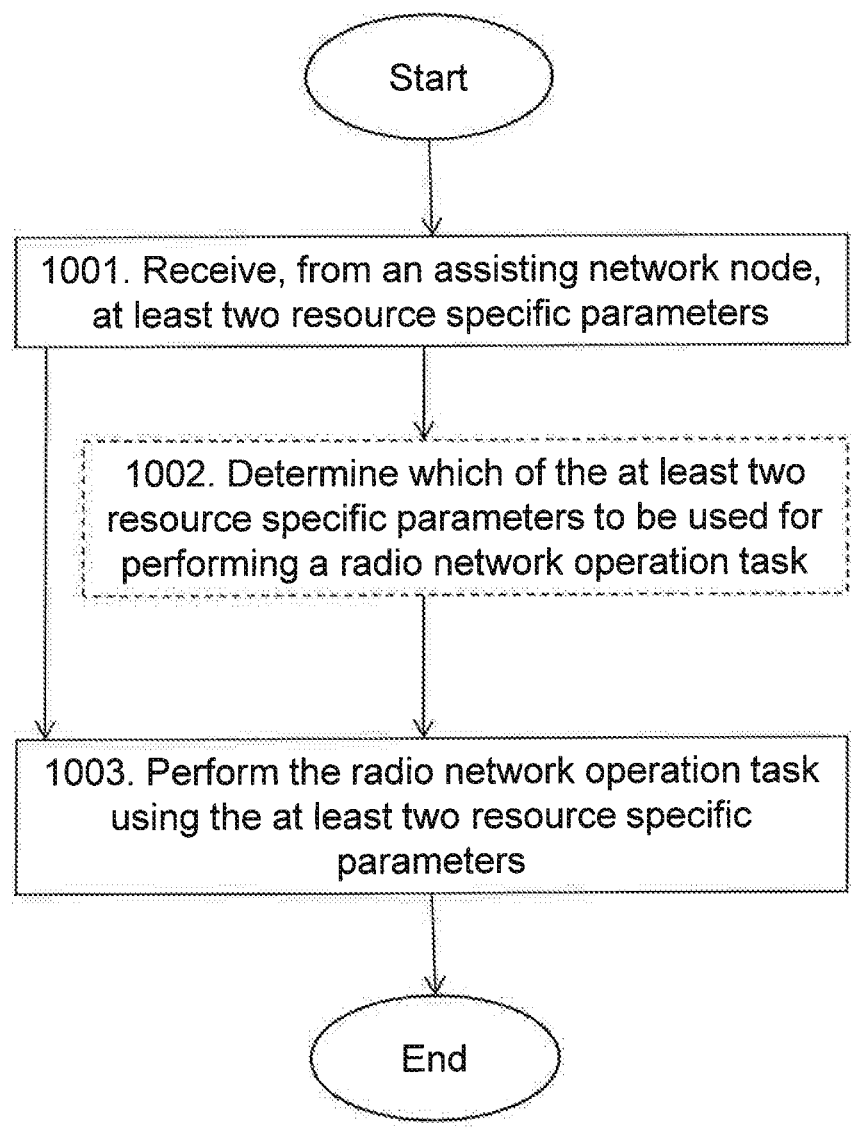
FIG. 10 is a flow chart depicting embodiments of a method in a performing network node.

A method in a performing network node 106,108 for performing a radio network operation task will now be described with reference to FIG. 10. As previously mentioned, the performing network node 106,108 is comprised in the communications network 100.

The method comprises the following actions, which do not have to be performed in the order stated below, but may be taken in any suitable order. Further, actions may be combined.

Action 1001

The performing network node 106,108 receives at least two resource specific parameters from an assisting network node 104,108 comprised in the communications network 100. The at least two resource specific parameters indicate different transmit power levels of a radio signal. Further, the different transmit power levels relate to at least two different resources in two different time periods for the first type of radio signal. The at least two different resources may be at least two different time and/or frequency resources.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

In some embodiments, the at least two resource specific parameters are expressed in terms of one of the following: absolute values, at least one of the at least two resource specific parameters is expressed in terms of a relative value with respect to the other one of the at least two resource specific parameters, and at least one of the at least two resource specific parameters is expressed in terms of a relative value with respect to a reference value.

Action 1002

The performing network node 106,108 may further determine which one of the at least two resource specific parameters that is/are to be used for performing the radio network operation task based on information associated with the at least two resource specific parameters. The information may comprise one or more of: a pattern, a radio signal type, measurement type, a cell or node identification.

Action 1003

The performing network node 106,108 performs the radio network operation task using the at least two resource specific parameters.

In some embodiments, the radio network operation task is a task selected from the group comprising: interference estimation, interference prediction, path loss estimation, uplink power control, building up assistance data, informing a wireless device 102 comprised in the communications network 100 of a transmit power of the assisting network node 104,

108, adjusting at least one transmit power related to the performing network node 106,108, configuring at least one signal transmitted by the performing network node 106,108, configuring at least one measurement pattern in the performing network node 106,108, configuring at least one measurement pattern for performing measurement in a cell associated with the performing network node 106,108, and/or adjusting a parameter value with regard to the parameter value used in one or more neighboring network nodes 104,108.

In such embodiments, the assisting network node 104,108 is the first network node 104 such as an eNode B, a base station, a relay node, or a donor node, and the performing network node 106,108 is an eNode B, a base station, a relay node, a donor node, a RNC, a BSC, a positioning node or a SON node.

In some other embodiments, the radio network operation task is a task selected from the group comprising: network planning, management of parameters used in the communications network 100, optimization of parameters used in the communications network 100, modify or recommend a time period of the radio signal, recommend updates for the time period, recommend updates of a frequency-related configuration, building up positioning assistance data, and/or building up assistance data intended to support measurements.

In such embodiments, the assisting network node 104,108 is an eNode B, a base station, a relay node, or a donor node, a RNC, a BSC, a positioning node or a SON node, and the performing network node 106,108 is a SON node, a MDT node, an OSS node, an O&M node, a network monitoring node, a coordinating node, or a positioning node.

Figure 11:
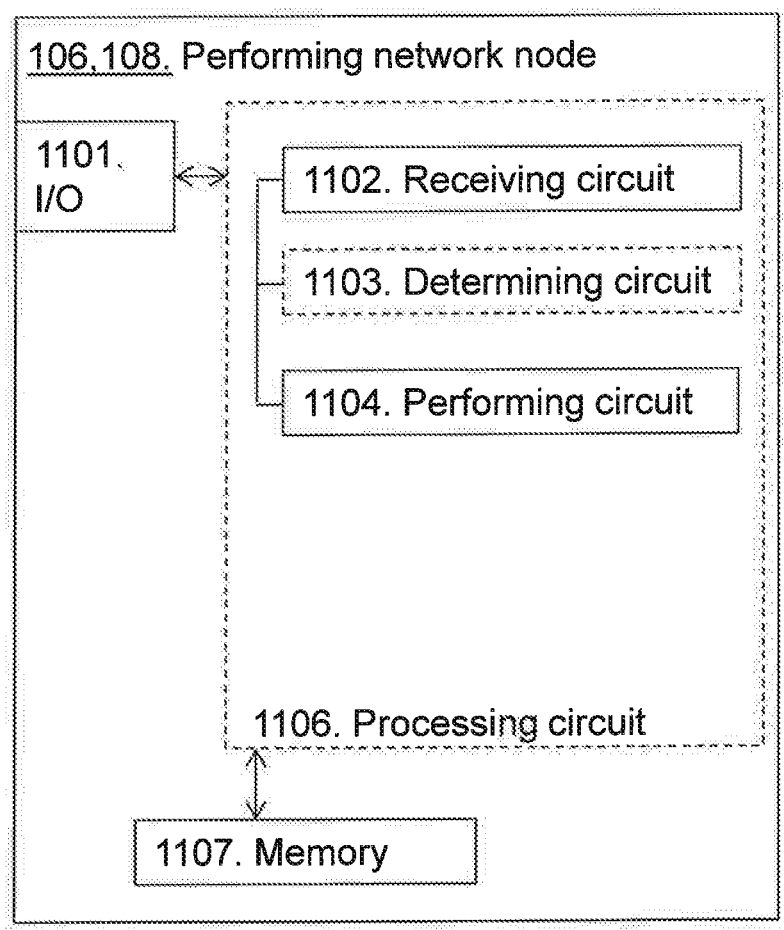
FIG. 11 is a schematic block diagram illustrating embodiments of a performing network node.

To perform the method actions in the performing network node 106,108 described above in relation to FIG. 10, the performing network node 106,108 may comprise the following arrangement depicted in FIG. 11. As previously mentioned, the performing network node 106,108 is comprised in the communications network 100.

The performing network node 106,108 comprises an input and output (I/O) interface 1101 configured to function as an interface for communication in the communication network 100. The communication may for example be communication with a wireless device 102 and/or with another network node 104,106,108.

The performing network node 106,108 comprises a receiving circuit 1102 configured to receive at least two resource specific parameters from an assisting network node 104,108 that is comprised in the communications network 100. The at least two resource specific parameters indicate different transmit power levels of a first type of radio signal, and the different transmit power levels relate to at least two different resources in two different time periods for the first type of radio signal. The at least two different resources may be at least two different time and/or frequency resources.

The first type of radio signal may be a physical signal such as a Cell-specific Reference Signal (CRS), a synchronization signal, a Multimedia Broadcast Single Frequency Network (MBSFN) reference signal, a specific reference signal for the wireless device (102), a Positioning Reference Signal (PRS), or a Channel State Information Reference Signals (CSI-RS) or any a physical channel, such as a Physical Downlink Shared Channel (PDSCH), a Physical Broadcast Channel (PBCH), a Physical Multicast Channel (PMCH), a Physical Control Format Indicator Channel (PCFICH), a Physical Downlink Control Channel (PDCCH), a Physical Hybrid ARQ Indicator Channel (PHICH).

In some embodiments, the at least two resource specific parameters are expressed in terms of one of the following: absolute values, at least one of the at least two resource specific parameters is expressed in terms of a relative value with respect to the other one of the at least two resource specific parameters, and at least one of the at least two resource specific parameters is expressed in terms of a relative value with respect to a reference value.

The performing network node 106,108 comprises further a performing circuit 1104 configured to perform the radio network operation task using the at least two resource specific parameters.

In some embodiments, the radio network operation task is a task selected from the group comprising: interference estimation, interference prediction, path loss estimation, uplink power control, building up assistance data, informing a wireless device 102 comprised in the communications network 100 of a transmit power of the assisting network node 104, 108, adjusting at least one transmit power related to the performing network node 106,108, configuring at least one signal transmitted by the performing network node 106,108, configuring at least one measurement pattern in the performing network node 106,108, configuring at least one measurement pattern for performing measurement in a cell associated with the performing network node 106,108, and/or adjusting a parameter value with regard to the parameter value used in one or more neighboring network nodes 104,108.

In such embodiments, the assisting network node 104,108 is the first network node 104 such as an eNode B, a base station, a relay node, or a donor node, and the performing network node 106,108 is an eNode B, a base station, a relay node, a donor node, a RNC, a BSC, a positioning node or a SON node.

In some other embodiments, the radio network operation task is a task selected from the group comprising: interference estimation, interference prediction, path loss estimation, uplink power control, building up assistance data, informing a wireless device 102 comprised in the communications network 100 of a transmit power of the assisting network node 104,108, adjusting at least one transmit power related to the performing network node 106,108, configuring at least one signal transmitted by the performing network node 106,108, configuring at least one measurement pattern in the performing network node 106,108, configuring at least one measurement pattern for performing measurement in a cell associated with the performing network node 106,108, and/or adjusting a parameter value with regard to the parameter value used in one or more neighboring network nodes 104,108.

In such embodiments, the assisting network node 104,108 is a the first network node 104 such as an eNode B, a base station, a relay node, or a donor node, and the performing network node 106,108 is an eNode B, a base station, a relay node, a donor node, a RNC, a BSC, a positioning node or a SON node.

In some embodiments, the performing network node 106, 108 further comprises a determining circuit 1103 configured to determine which of the at least two resource specific parameters is to be used for performing the radio network operation task based on information associated with the at least two resource specific parameters. The information may comprise one or more of: a pattern, a radio signal type, a measurement type, a cell or node identification.

Embodiments herein for performing a radio network operation task may be implemented through one or more processors, such as a processing circuit 1106 in the performing network node 106,108 depicted in FIG. 11, together with computer program code for performing the functions and/or method actions of embodiments herein.

It should be understood that one or more of the circuits comprised in the performing network node 106,108 described above may be integrated with each other to form an integrated circuit.

The performing network node 106,108 may further comprise a memory 1107. The memory may comprise one or more memory units and may be used to store for example data such as thresholds, predefined or pre-set information, etc.

Time-Frequency Resource-Specific BS Transmit Power Information.

Conventionally, the BS 104,106 transmit power for a specific signal (e.g. CRS) provided to the UE 102 is assumed to be the same regardless of the type of sub frames or frequency resources (e.g., RBs). With the technology described here, the BS 104,106 signals at least two parameters associated with, depicting, or corresponding to the transmit power for the same signal type, e.g. a first type of signal, such as any physical signal such as CRS or synchronization signals, where (1) a first resource specific transmit power parameter (or simply first parameter) is associated with transmit power of the first signal transmitted in first time period (e.g. subframe #0 and subframe #5), and (2) a second resource specific transmit power parameter (or simply second parameter) is associated with transmit power of the first signal transmitted in second time period (e.g. all subframes except subframes #0 and #5). This relates to e.g. Actions 402, 606, 801, 803 and 1001 described above. The first signal is herein sometimes also referred to as the first type of signal or the first type of radio signal.

The term 'signal' can be any type of signal or channel. A resource can be a resource in time, in frequency, a time-frequency resource, space, etc. A common example of resource is a resource element comprising of a reference signal, which in turn is a time-frequency resource. An example of a time resource is a time slot. An example of a frequency resource is a subcarrier or a subband or a part of the bandwidth.

For simplicity, example embodiments are described using two sets of parameters for the same signal transmitted by the radio node (e.g. BS, relay, etc.) 104,106 including a first parameter associated with the first transmitted signal, and a second parameter associated with the first transmitted signal. This relates to e.g. Action 402 described above.

In general, the term "BS" may also refer to a cell since multiple cells may be associated with one radio node and the two parameters may be cell-specific.

Some examples of parameters are absolute, relative or indexed transmit power levels, or a parameter which determines the transmit power level (e.g., $P_A$ or $P_B$). The first and the second parameters may be the same (and may have the same values) or may be different.

The first and second parameters may be associated with the additional information such as any of:

Related to certain time (e.g., subframes, time instances) and/or frequency resources (e.g., a subband, part of the system bandwidth, 6 center resource blocks, band edge, component carrier, carrier frequency), where the resources may also be determined by a pattern characterized by Pattern type, e.g., transmission pattern (e.g., subframes in ABS pattern in eICIC, muting pattern for OTDOA etc), measurement pattern (e.g., restricted measurement subframe pattern for eICIC), etc. For example the first parameter and second parameter are associated with transmit power of CRS in ABS subframes and non-ABS subframes respectively. In another example the first parameter and second parameter are associated with transmit power of PRS in muted PRS subframes and normal (un-muted) PRS subframes respectively.

Pattern purpose, e.g., positioning subframes and ABS for interference coordination or blank MB SFN subframes and non-MB SFN ABS subframes.

Pattern parameters, e.g., periodicity and the reference time point determining when each parameter applies in time.

Signal type (e.g., one or more of physical signals)

Measurement type (e.g., RSRP, RSRQ, timing measurement, pathloss measurement)

Frequency and/or RAT

The parameters may also be associated with inter-frequency or inter-RAT measurements, e.g., when a UE served in an HSPA cell is performing inter-RAT measurements on E-UTRAN Cell ID of cell or node transmitting the first signal using first and second parameter values Dynamic range, which may be one or more and may also be dynamically configured For example, this relates to Actions 801, 804, 1001 and 1002 described above.

In general, example embodiments are applicable to any number of parameters which are associated with the same signal type. The embodiments are also applicable to resource specific transmit power parameters for more than one signal type. For example, the power of more than one signal may be reduced in certain subframes or in certain subframes and certain frequency resources by X dB.

In one example, the first parameter is associated with a transmission pattern, e.g., ABS, configured for interference coordination purpose in heterogeneous deployments. In another example, the first parameter is associated with positioning subframes.

Signaling of Capabilities Associated with Handling Resource-Specific BS Transmit Power.

In this part of the description, node 104,106,108 and UE 102 capabilities associated with handling resource-specific BS transmit power are described. The capabilities may be pre-determined (and e.g., obtained from the memory), configured in the node 104,106,108, or received from another node 104,106,108 or UE 102. A capability may also be associated with any of the additional information described above.

A radio network node 104,106,108 may be capable of dealing with resource-specific transmit power. Examples include (1) configuring the first signal transmission power using the first and the second resource-specific transmit power parameters, (2) dynamically controlling/reconfiguring/updating the first signal transmission power using the first and the second resource-specific transmit power parameters, (3) storing in the memory the information about the first signal transmission power or the and the second parameter associated with the first and second resource, (4) receiving from another node 104,106,108, e.g., eNodeB, SON, etc. or UE 102 the parameter configuration or the information related to the first or second parameter, (5) transmitting to another node, e.g., eNodeB, SON, etc., or UE 102 the parameter configuration or the information related to the first or second parameter, (6) determining the first and/or the second parameter autonomously or based on the received information or measurements from another node 104,106,108 or UE 102, (7) determining the first and the second resource autonomously or based on the received information or measurements from another node 104,106,108 or UE 102, (8) obtaining or receiving from another node 104,106,108 an indication or a request triggering configuring the first and the second parameter or the first or second time periods, where an indication may be related to interference or load estimation, e.g., 'high interference', 'low interference', 'overloaded', etc., and/or (9) sending a request or the indication for the need to another node 104,106,108, e.g., eNodeB or SON, for configuring the first and the second parameter.

This relates to e.g. Actions 606, 803 and 1003 described above.

The method may further comprise at least one of:

Informing about its capability (of dealing with time-frequency resource-specific transmit power) other nodes, e.g., O&M, SON node, MDT node, positioning node, other radio network nodes or UE. The radio network node may report this capability to the other network node during the initial setup, upon receiving explicit request from the other network node or under specific circumstances (e.g. radio network node is modified, upgraded or new target node is connected etc).

Obtaining the capability (of dealing with time-frequency resource-specific transmit power) of another network node from the UE or another node, upon request or without request, Obtaining from the UE 102 or another node 104,106,108 the UE capability of handling time-frequency resource-specific BS transmit power (see e.g., Section 3.1.2.2) for signal measurements, Requesting from the UE 102 or another node 104,106,108 the UE capability of handling time-frequency resource-specific BS transmit power (see e.g., Section 3.1.2.2) for signal measurements.

This relates to e.g. Actions 602, 801 and 806 described above.

Methods in UE 102 of Reporting its Capability of Handling Resource-Specific BS Transmit Power for Signal Measurements.

All the UEs 102 may not be capable of handling or distinguishing between resource-specific BS transmitted power information. Hence they may not be able to use the resource-specific BS transmitted power for signal measurements. The signal measurements may be any type of signal reception e.g. mobility measurements, positioning measurements, timing measurements, measurements for power control such as pathloss, measurements for scheduling, CSI, demodulation or reception of user data such as PDSCH or control information such as PDCCH, paging reception, BCH reception, positioning measurements on PRS or CRS, cell identification involving measurements on synchronization signals, etc.

Hence UE 102 may report its capability that it supports the handling resource-specific BS transmit power information for a specific signal type or subset of signal types or for all signal types. The UE 102 may report this capability to the network node 104,106,108, e.g. eNode B, relay, positioning node, during the initial setup, at handover or anytime. They may report this capability to the network node 104,106,108 either proactively or upon receiving explicit request from the network node 104,106,108 or upon a certain event (e.g., a measurement, e.g., signal quality, is below a threshold or a measurement is above a threshold, e.g., interference level).

For example, this relates to Actions 401, 404, 601 and 805 described above.

Methods of Signaling Resource-Specific BS Transmit Power Information.

The time-frequency resource-specific BS transmit power information or a request for it may be signaled by a radio node 104,106,108 applying the resource-specific BS transmit power control/adjustment, another network node 104,106,
108, e.g., a coordinating node or SON node or positioning node, a relay node, and/or a UE 102 (the information related to another node, e.g., the UE's serving node, may be reported to another UE or node—see below). The time-frequency resource-specific BS transmit power information may be signaled to another radio node 104,106,108, e.g., a neighbor node for the purpose of interference coordination or target node in handover, another network node 104,106,108, e.g., a coordinating node, positioning node or SON node, a relay node, and/or a UE 102. The information may be communicated via uni-cast, broadcast or multi-cast signaling.

Some embodiments relating to examples of signaling time-frequency resource-specific BS transmit power information are described in more detail in the following subsections.

Methods in Network Node 104,106 of Signaling to UE 102.

The network node 104,106 serving the UE 102, signals at least the first parameter associated with the first transmitted signal and the second parameter associated with the first transmitted signal to the UE 102. The first signal is transmitted by the radio node 104,106 which is currently serving the UE 102 or which may serve the UE 102, e.g. after cell change such as HO, PCell change in CA etc.

The first and second parameters may be expressed in terms of absolute values (e.g. dBm, watts etc) or relative values with respect to reference value(s). The reference value may be for instance the maximum output power of the radio network node or any pre-defined value. Yet in another example the first parameter may be signaled in terms of absolute value whereas the second parameter may be signaled relative to the value of the first parameter. The signaled parameters may be associated with at least some of the additional information described above. Furthermore, some of the information may be pre-defined, e.g., related time instances or signal type. The additional information may also be explicitly signaled, e.g., frequency information, bandwidth, transmission or measurement pattern, etc. The association between the parameters and the additional information may also be pre-defined or indicated by the network node 104,106 to the UE 102 or combination thereof.

The network node 104,106 may also indicate to the UE 102 the parameter to be used for performing a particular measurement. For example the UE 102 may be indicated to perform RSRP measurement only using first parameter. Such relation between the parameter and the associated measurement may also be pre-defined.

In a specific embodiment, the ranges, i.e., the difference between the smallest possible and the maximum possible values, of any of $P_A$ and $P_B$ or similar parameters are enlarged particularly to enable configuring low-interference subframes, e.g., positioning subframes or ABS subframes used for inter-cell interference coordination in heterogeneous deployments, where the transmit power may be reduced to zero or almost zero on one or more signals or channels. The parameters may also be associated with a specific time instances or time periods and/or a block of frequency resources (e.g., an edge of a band or N center resource blocks of a bandwidth). Such association may be pre-defined or configured by signaling the necessary information, e.g., the time instances, patterns, etc., where the necessary information may also be signaled together with the parameter it is associated with. The UE 102 behavior should also be such that the UE 102 is able to receive, understand and apply dynamically multiple sets of parameters.

This relates to e.g. Actions 606, 607, 802, and 1001 described above.

Methods in Network Node 104,108 of Signaling to Other Network Nodes 106,108.

The network node 104,108 may signal the resource specific transmit power information to other network nodes 106,108. For example the eNodeB may signal this to neighboring eNode B, e.g., over X2 interface or via O&M. The receiving eNode B may signal this information (i.e. resource specific transmit power information related to serving and neighboring cells) to the UE 102 to assist UE 102 measurements e.g. RSRP, RSRQ, RSTD, UE Rx-Tx time difference measurement, cell identification, RLM etc.

Another example is when eNodeB signals the parameters associated with resource-specific transmit power allocation to a positioning node, e.g., to facilitate distance estimation based on power-based measurements, e.g., based on RSRP, or to facilitate fingerprinting positioning methods and prevent or at least minimize the position errors due to power variation.

In one example embodiment, the dynamic range information associated with one or more dynamic ranges may be exchanged between two radio nodes 104,106, e.g., eNodeBs, or may be communicated from a radio node 104,106 to another network node 108, e.g., SON or positioning node. The dynamic range may be associated with specific time and/or frequency resources. Such association may be pre-defined or configured by signaling the necessary information, e.g., the time instances, patterns, etc. In another embodiment, the dynamic range or a set of dynamic ranges is a part of node's capability, where the capability may also be exchanged among the nodes 104,106,108 and between the UE 102 and the node 104,106,108.

This relates to e.g. Actions 402 and 404 described above.

Methods of Using Resource-Specific BS Transmit Power Information—Methods in UE 102 for Performing Measurements.

According to this aspect, the method in the UE 102 (in its general sense, e.g., the embodiments apply also e.g. for any radio node equipped with a UE-like technology enabling receiving in DL) comprises the step of performing one or more measurements based on or by using the information associated with the resource-specific BS transmit power. The information may be obtained autonomously (e.g., at least one of the parameters may be pre-defined or obtained based on measurements, table look up or similar) or through the received signaling.

Examples of measurements which can be performed by the UE 102 include mobility measurements, e.g., RSRP, RSRQ, etc., radio link monitoring, e.g., out of sync, in sync evaluations, etc., pathloss measurements for UL power control or other purposes, channel estimation or any measurement associated with it, positioning measurements, e.g., RSTD, RSRP, RSRQ, UE Rx-Tx time difference, etc., any RRM measurement in general e.g. identification of cell, acquisition or determination of cell timing, cell synchronization, uplink timing adjustment based on downlink timing, etc., and RLM measurements.

The UE 102 may use signals associated with the first parameter, second parameter, or both parameters for performing a certain type of measurement. The measurements on the first signal performed in the first and second time periods may also be aggregated into a single measurement, e.g., average or weighted average, where the aggregate measurement may be obtained using the time-frequency resource-specific BS transmit power information.

As described earlier, the UE 102 may be explicitly requested to perform particular measurement using first or second parameter or both parameters. In this case the UE 102 performs the measurement according to the received measurement configuration. In another embodiment, the UE 102 may perform a particular measurement over signals associated with the first, second or both parameters in accordance with the pre-defined rules. A few examples of pre-defined rules are provided here. In one example, it may be pre-defined that mobility measurements, e.g. RSRP, RSRQ etc., are performed over signals associated with the first parameter, e.g. over CRS in non-ABS subframes. In another example, it may be pre-defined that measurements, e.g. RSRP, RSRQ etc., are performed over signals associated with the parameter which indicates or depicts larger transmit power level. In yet another example, it may be pre-defined that measurements, e.g. RSRP, RSRQ etc., are performed over signals associated with any one or both parameters in case the parameter values are within a certain range or margin.

In another embodiment, the UE 102 may autonomously decide to use any one or both parameters for performing a particular measurement. In this case, the UE 102 may also inform the network 100 about the parameter(s) used for performing a particular measurement.

In yet another embodiment, it may also be pre-defined that certain measurements, e.g. RSRP, RSRQ etc. can be performed on signals associated with the first or second or both parameters as indicated by the network 100 while certain measurements can be performed based on pre-defined rules, e.g. UE Rx-Tx time difference on only first parameter, and while certain measurements can be performed based on UE autonomous decision, e.g. path loss measurement.

The UE 102 may also send the measurement results to the network 100, e.g. to the third network node 108, which in turn may use them for various purposes, e.g., mobility, network planning, network monitoring, etc. This relates to e.g. Actions 406 and 608 described above.

According to another aspect, the UE 102 performs one or more tasks or takes one or more actions, which can be based on the acquired information and/or its supported capability. Some examples of tasks or actions are:
- Trigger cell selection or cell reselection when in idle state e.g. if measurement is not feasible on existing serving and/or neighbor cells,
- Trigger a handover mechanism when in connected state e.g. if measurement is not feasible on existing serving and/or neighbor cells,
- Adjust a signal detection threshold for the first signal or second signal or both for performing one or more measurements, e.g.,
  - Use different signal detection thresholds for the first signal in the first and the second time periods, where the difference in the signal detection thresholds may relates to at least one of the parameters or the difference between the parameters.
- Adjusting a threshold of an event trigger Methods of Using Resource-Specific BS Transmit Power Information—Methods in Radio Network Node.

The resource-specific BS transmit power information related to first radio node 104 may be communicated to UE 102 or other radio network nodes 106 designated as second network nodes 106. The first radio node 104 is the source radio network node, and the second node 106 is the network target node. Examples of a first radio network node 104 are eNode B, relay node, donor node, base station, etc. Examples of a second network nodes 106 are eNode B, relay node, donor node, base station, Node B, RNC, BSC, positioning node, SON, etc.

This information may also be used by the second node for one or more purposes, e.g.:

Interference estimation/prediction,

Pathloss estimation with respect to the neighbor radio node,

Uplink power control for the UE transmitting to the first radio node,

Building up assistance data intended to support UE measurements or other radio node measurements, e.g., the assistance data may include a neighbor cell list, Informing the UE about the transmit power of the first radio network node. For example, the old serving eNode B may signal this information about the target eNode B to the UE prior to the cell change, where the target eNode B is the new serving node. In another example the HSPA RNC may signal this information about the target eNode B to the UE prior to the cell change.

The cell change can be cell reselection, handover, RRC connection release with redirection, RRC re-establishment, change of PCell or PCC in carrier aggregation, a serving cell change with carrier aggregation (multiple serving cells are possible with carrier aggregation), etc.

The UE may use this information for one or more purposes. For instance it may use this for estimating pathloss for accessing the new cell, e.g. sending random access, or for positioning.

If the second node is LTE node e.g. eNode B, LTE relay, LTE donor node, etc., then it may perform e.g. one of more of following actions:

Adjusting at least one transmit power related parameter of the second radio node (Re)configuring at least one signal transmitted by the second node (e.g., configuring any of: time-frequency resources, sequence, power, transmit antennas, signal muting, etc.), (Re)configuring at least one transmission pattern in the second node (e.g., ABS or positioning occasions), (Re)configuring at least one measurement pattern for performing measurements in cell associated with the second radio network node, Aligning or adjusting the value of parameter value w.r.t. the values used in one or more neighboring first radio node.

This relates to e.g. Actions 402, 803 and 1003 described above.

Methods in a General Network Node.

The third network node 108 may be connected to first radio network node 104 and/or second radio network node 106 via standardized or propriety interface(s). Examples of third network nodes 108 are SON, MDT, OSS, O&M, network monitoring node, coordinating node, positioning node, etc. The third network node 108 may receive the resource-specific BS transmit power information and UE (in a general sense) measurement results of measurements based on resource-specific BS transmit power, etc. from the first and/or second nodes. The first and/or second radio network node 104,106 may send this information to third node 108 proactively or when requested by the third node or upon a certain trigger/condition, e.g., related to interference estimation, signal measurements, or load measurements, etc. This relates to e.g. Actions 406 and 608 described above.

In one example, the third network node 108 may use the resource-specific BS transmit power information of one or more BSs for network planning, management and optimization of parameters used in the network 100. For example the third node 108 may update, e.g. may lower or increase, or recommend certain maximum output power on different signals and/or on certain time and/or frequency resources in one or more base stations or associated cells in a coverage area. In another example the third node 108 may modify or recommend the time period of first and/or second signals in one or more base stations in a coverage area, or it may recommend updates for the first time period or the second time period or updates for any of the frequency-related configuration, e.g., bandwidth or its part, frequency carrier, carrier component, etc.

In another example, positioning node may use the information when building up the positioning assistance data. For example, the information related to the at least two parameters may be included in the positioning assistance data transmitted from E-SMLC to UE or to measurement units, e.g., LMUs.

In another example, a coordinating node may use the information when building up any assistance data intended to support UE measurements or radio node measurements.

This relates to e.g. Actions 402, 803 and 1003 described above.

Methods of Meeting Enhanced Requirements.

The embodiments described here may apply when the first signal is a physical signal, e.g., reference signal, synchronization signal, etc, or when the power is adjusted on one or more, e.g. a subset of all or all other channels, e.g., control channels or data channels, such that the first transmit power level is used in the first time period and the second transmit power level is used in the second time period. More than two time periods are possible, and more than two transmit power levels are also possible. An example scenario is when low-interference subframes are configured in the network for the purpose of inter-cell interference coordination. The low-interference subframes may be ABS subframes or any subframes or any time periods during which lower transmit power or lower transmission activity are exercised. Such periods may be organized in patterns, and the patterns may also be multi-level power patterns, as e.g. described in PCT/SE2011/050831 filed on Jun. 23, 2011, the contents of which are incorporated herein by reference.

Method in Radio Network Node 104,106,108 to Meet Radio Network Node Requirements.

At least one the following radio network node 104,106,108 requirements may need to be enhanced in relation to allowing the radio nodes to adjust their power on selected signals:

transient periods, e.g., the enhanced requirement may specify the maximum time between two time intervals where the power adjustment is used, e.g., at level X dBm. and where it is not used, e.g., Y=X+ΔdBm, power adjustment accuracy, increased dynamic power ranges, e.g., total power dynamic range and RE Power control dynamic range may need to be increased to allow for a larger variation in the transmit power between the first and second time periods, and more than one dynamic range may be configured in the same node.

In another embodiment, dynamic range may be dynamically configured or switched, i.e., two dynamic ranges exist. Using more than one dynamic range may also imply using different software or hardware or their different configurations, each associated with the different dynamic ranges. The configuring of dynamic ranges may depend on a time instance or certain time period associated with interference coordination such as reduced-power or reduced activity subframes used for inter-cell interference coordination or positioning subframes. A radio network node 104,106,108, such as eNodeB, may adjust the dynamic range periodically or depending on a condition, where the condition may be associated with a certain time or certain configuration of transmissions. A network node 104,106,108, e.g., eNodeB, SON node, O&M, positioning node, may also configure, indicate the need or trigger (re)configuring of a larger dynamic range at another node 104,106,108, e.g., eNodeB, upon a certain condition or periodically. An example condition may be associated with an interference level or interference indicator or load indicator.

In another embodiment, the RE power control dynamic range may be configured dynamically, i.e., at least two dynamic ranges exist, in a radio node 104,106,108 upon an indication or trigger from another node 104,106,108, e.g. eNodeB or SON, O&M, positioning node, an event or a certain condition, periodically or at certain time instances or time periods e.g. associated with inter-cell interference coordination. An example condition may be associated with an interference level or interference indicator or load indicator.

In yet another example, the functionality of configuring multiple dynamic ranges may be related to dynamic amplifier control. Each of the multiple dynamic ranges may be further associated with different conditions.

The node applying multiple dynamic ranges may have also implemented a control unit which may controls switching between the software or HW configurations so at least two different configurations are associated two different dynamic ranges.

The enhanced requirement may apply separately for different types of radio nodes 104,106,108, e.g., home eNodeBs, relays, donor nodes, eNodeBs of different power classes, radio nodes not creating own cell IDs such as beacon devices used e.g. for positioning, etc.

In order to meet the above mentioned requirements the radio network node 104,106,108 may be required to implement additional circuitry such as memory unit and processing unit.

This relates to e.g. Action 604 described above.

Method in UE 102 (in a General Sense) to Meet UE Requirements.

When the total power is reduced, it is expected that the received signal strength may reduce. In some cases, depending on whether the interference is changed or not, also the signal quality may reduce. These may impact UE measurements performed on the signals to which the transmit power adjustment applies. Thus the corresponding requirements for UE measurements, which are either performed only on signals transmitted with the reduced power or involving measurements on signals transmitted with the reduced power, have to be adjusted. Alternatively the requirements may be separately defined for the case when power is reduced or transmission activity is low. This may apply to requirements pertaining to intra-frequency, inter-frequency, carrier aggregation/multi-carrier or inter-RAT measurements.

Some examples are: Increased cell identification time when e.g. reference signal power and/or synchronization signal power is reduced compared to the prior art requirements, e.g., when the signals are transmitted at the nominal power; relaxed measurement time, e.g., for positioning measurements, any timing measurement, mobility measurements, RLM measurements, CSI measurements, etc.; relaxed measurement accuracy, e.g., for RRM measurements, timing measurements, positioning measurements, pathloss measurements, etc., relaxed UL power control accuracy when the transmit power adjustment is used during a certain time interval, relaxed side conditions such as increased signal quality, increased signal strength, increased detection and/or demodulation signal levels or increased the target error rate, e.g., BLER.

The new UE measurement requirements should also account for the transmit power switching time, e.g., by adding an extra margin to e.g. measurement period or measurement accuracy.

In order to meet the above mentioned requirements the UE 102 may be required to implement additional circuitry such as memory unit and processing unit.

Methods of Configuring the Test Equipment, Test Cases, and Verifying the Enhanced Requirements.

The methods described, e.g., the method of configuration UE 102 or any wireless device e.g. mobile relay or small radio base station, can also be configured in the test equipment (TE) node, aka system simulator (SS) or test system (TS). The TE or SS will have to implement all configuration methods related to transmit power adjustment to be able to configure the UE and/or the network node for the test.

The test equipment will have to be capable of setting different power levels and/or transmission activity level of the transmitted signal, e.g. first signal such as CRS or synchronization signal, during first time period and the second time period when verifying the UE performance requirements associated with the transmit power adjustment described herein.

The purpose of the test is to verify that the UE 102 is compliant to the pre-defined rules, protocols, signaling and requirements associated with the transmit power adjustment described herein.

The tests are also performed to verify the radio network node requirements, signaling, protocol and procedures associated with the transmit power adjustment described herein. Typically, the TE or SS or TS separately performs tests for UE 102 and radio network nodes 104,106,108.

The testing may be measurement-specific and may be capability-dependent. For UE testing, the TE or SS will also be capable of:

Receiving the UE measurement results associated with the transmit power adjustment, Analyzing the received results e.g. comparing the with the reference results. The reference can be based on the pre-defined requirements or UE behavior or theoretical estimate or performed by a reference device. The reference device can be part of TE or SS.

In one embodiment, a new OCNG pattern associated with a certain amount of power reduction relative to a reference OCNG pattern may also be configured to model low-interference subframes such as ABS subframes or positioning subframes. The new OCNG pattern with a reduced power level may be used periodically or in the indicated subframes.

For the testing (aka conformance testing) of radio network node 104,106,108, e.g eNode B, relay, base station etc, the TE or SS are capable of:

Distinguishing and interpreting the same type of signal transmitted by the radio network node during the first and second time period.

Performing measurements on signals transmitted in first, second or both time periods by the radio network node e.g. at the transmit antenna port Analyzing the received results from the radio network node e.g. comparing the received results with the reference results. The reference can be based on the pre-defined requirements or eNodeB behavior or theoretical estimate or performed by a reference device. The reference device can be part of TE or SS.

Example advantages of the technology described include flexible transmit power configuration, more possibilities for interference coordination and enhanced capacity due to improved interference coordination, enhanced base station and UE requirements and test equipment configuration, enhanced signaling mechanisms, and enhanced energy saving.

ABBREVIATIONS

3GPP 3rd Generation Partnership Project
ABS Almost Blank Subframe
BS Base Station
CRS Cell-specific Reference Signal
eICIC enhanced ICIC
eNodeB evolved Node B
ICIC Inter-Cell Interference Coordination
LTE Long-Term Evolution
PCI Physical Cell Identity
RAT Radio Access Technology
RRC Radio Resource Control
SFN System Frame Number
SINR Signal-to-Interference Ratio
SRS Sounding Reference Signal
UEUser Equipment
UMTS Universal Mobile Telecommunications System Although the description above contains many specifics, they should not be construed as limiting but as merely providing illustrations of some presently preferred embodiments. For example, non-limiting, example embodiments of the technology were described in an LTE context. But the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method of operating a wireless device for performing a measurement on a first type of radio signal, wherein the wireless device is comprised in a communications network, and wherein the method comprises:
receiving the at least two resource specific parameters for the first type of radio signal, which the at least two resource specific parameters indicate different transmit power levels of the first type of radio signal, wherein the different transmit power levels relate to two different resources in two different time periods for the first type of radio signal;
receiving the first type of radio signal transmitted at two of the different transmit power levels; and
performing at least one measurement on the received first type of radio signal using the at least two resource specific parameters.

2. The method of claim 1, wherein one of the at least two resource specific parameters has a lower interference than the other of the at least two resources.

3. The method of claim 2, further comprising:
transmitting a result of the performed measurement to the first assisting network node or to the second assisting network node.

4. The method of claim 2, further comprising:
transmitting, to the first assisting network node or to the second assisting network node, a capability of handling resource specific parameters associated with the transmission of the first type of radio signal with different transmit power levels in different time periods for performing the at least one measurement.

5. The method of claim 4, wherein transmitting the capability further comprises:
transmitting the capability proactively, on request, or at an event such as at handover or connection set up.

6. The method of claim 4, wherein transmitting the capability further comprises:
transmitting the capability for a specific signal type or subset of signal types or for all signal types.

7. The method of claim 1, wherein receiving the at least two resource specific parameters for the first type of radio signal further comprises:
receiving the at least two resource specific parameters from a first assisting network node serving the wireless device and comprised in the communications network or from a second assisting network node comprised in the communications network, wherein the first assisting network node is an eNode B, a base station, a relay node, or a donor node, and wherein the second assisting network node is an eNode B, a base station, a relay node, a donor node, a Radio Network Controller (RNC), a Base Station Controller (BSC), a positioning node or a Self-Optimizing/Organizing Network (SON) node.

8. The method of claim 1, wherein receiving the at least two resource specific parameters for the first type of radio signal further comprises:
receiving a first resource specific transmit power parameter that is associated with the transmit power of the first type of radio signal transmitted in a first resource in a first time period; and
receiving a second resource specific transmit power parameter that is associated with the transmit power of the first type of radio signal transmitted in a second resource in a second time period.

9. The method of claim 1, wherein performing the at least one measurement further comprises:
performing at least one of a mobility measurement, a positioning measurement; a timing measurement; a measurement for power control; a path loss measurement; a measurement for scheduling; a Channel State Information (CSI) measurement, a measurement for demodulation or reception of user data or control information, paging reception, Broadcast Channel (BCH) reception, Physical Downlink Shared Channel (PDSCH) reception; control channel reception, Physical Multicast Channel (PMCH) reception, a positioning measurement on a Positioning Reference Signal (PRS), or a Cell-specific Reference Signal (CRS) a cell identification measurement involving a measurement on a synchronization signal, radio link monitoring, a measurement of path loss, a channel estimation, and a measurement of Radio Resource Management (RRM).

10. The method of claim 1, further comprising:
complying to at least one pre-defined requirement associated with the performed measurement on the first type of radio signal using the at least two resource specific parameters, which pre-defined requirement is at least one of: cell identification time based on the received first type of signal transmitted at the different transmit power levels in different resources, radio link monitoring requirement, measurement or evaluation period of measurement, measurement accuracy of the measurement or reporting range of the measurement, receiver dynamic range requirement, adaptively using two dynamic range configurations.

11. The method of claim 1, wherein the first type of radio signal is:
any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS) or a Channel State Information Reference Signals (CSI-RS); or
any one of the following physical channels: Physical Downlink Shared Channel, (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

12. A method of operating an assisting network node for assisting a wireless device in performing a measurement on a first type of radio signal, wherein the assisting network node and the wireless device are comprised in a communications network, and wherein the method comprises:
determining at least two different resources for the first type of radio signal in two different time periods, wherein each of the at least two different resources is associated with a resource specific parameter;
transmitting, to the wireless device, the first type of radio signal at different transmit power levels; and
transmitting, to the wireless device, the at least two resource specific parameters that indicate different transmit power levels of the first type of radio signal associated with the two different time periods, wherein the different transmit power levels relate to the at least two different resources, and whereby the wireless device may perform at least one measurement on the first type of radio signal using the at least two resource specific parameters.

13. The method of claim 12, wherein one of the at least two resources has a lower interference than the other of the at least two resources.

14. The method of claim 12, wherein transmitting the at least two resource specific parameters for the first type of radio signal further comprises:
transmitting a first resource specific transmit power parameter that is associated with the transmit power of the first type of radio signal transmitted in a first resource in a first time period; and
transmitting a second resource specific transmit power parameter that is associated with the transmit power of the first type of radio signal transmitted in a second resource in a second time period.

15. The method of claim 12, wherein the at least two resource specific parameters for the first type of radio signal are expressed in terms of one of the following:
absolute values;
at least one of the at least two resource specific parameters is expressed in terms of a relative value with respect to the other one of the at least two resource specific parameter; and
at least one of the at least two resource specific parameters is expressed in terms of a relative value with respect to a reference value.

16. The method of claim 12, further comprising:
indicating to the wireless device which of the at least two resource specific parameters is to be used for performing the at least one measurement on the first type of radio signal.

17. The method of claim 12, further comprising:
receiving, from the wireless device, a result of the performed at least one measurement on the first type of radio signal.

18. The method of claim 12, further comprising:
receiving, from the wireless device, a capability of handling resource specific parameters associated with the transmission of the first type of radio signal with different transmit power levels in different time periods for performing the at least one measurement.

19. The method of claim 18, wherein receiving the capability further comprises:
receiving the capability proactively, on request, or at an event such as at handover or initial set up.

20. The method of claim 18, wherein receiving the capability further comprises:
receiving the capability for a specific signal type or subset of signal types or for all signal types.

21. The method of claim 12, further comprising:
transmitting a capability of the assisting network node, which capability is a capability of handling resource specific parameters associated with the transmission of the first type of radio signal with different power levels in different time periods to a first assisting network node, a second assisting network node and/or to the wireless device, wherein the first assisting network node is an eNode B, a base station, a relay node, or a donor node, and wherein the second assisting network node is an eNode B, a base station, a relay node, a donor node, a Radio Network Controller (RNC), a Base Station Controller (BSC), a positioning node or a Self-Optimizing/Organizing Network (SON) node.

22. The method of claim 12, wherein the first type of radio signal is:
any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS), or a Channel State Information Reference Signals (CSI-RS), or
any one of the following physical channels: Physical Downlink Shared Channel, (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

23. The method of claim 12, further comprising:
complying to at least one pre-defined requirement associated with the two parameters related for the two different power levels, which pre-defined requirement is at least one of: transient periods, power adjustment accuracy, increased transmitter dynamic power ranges, more than one dynamic range configured by the assisting network node.

24. A method of operating an assisting network node for assisting a performing network node in performing a radio network operation task, wherein the assisting network node and the performing network node are comprised in a communications network, and wherein the method comprises:

determining at least two different resources for a first type of radio signal, wherein each resource is associated with a resource specific parameter, and wherein one of the at least two resources has a lower interference than the other of the at least two resources; and transmitting to the performing network node the at least two resource specific parameters, wherein the at least two resource specific parameters indicate different transmit power levels of the first type of radio signal, and wherein the different transmit power levels relate to the at least two different resources in two different time periods for the first type of radio signal, whereby the performing network node may perform the radio network operation task using the at least two resource specific parameters.

25. The method of claim 24, wherein transmitting the at least two resource specific parameters further comprises:

transmitting a first resource specific transmit power parameter that is associated with the transmit power of the first type of radio signal transmitted in a first resource in a first period of time; and transmitting a second resource specific transmit power parameter that is associated with the transmit power of the first type of radio signal transmitted in a second resource in a second period of time.

26. The method of claim 24, wherein the at least two resource specific parameters are expressed in terms of one of the following:

absolute values;

at least one of the at least two resource specific parameters is expressed in terms of a relative value with respect to the other one of the at least two resource specific parameters; and at least one of the at least two resource specific parameters is expressed in terms of a relative value with respect to a reference value.

27. The method of claim 24, further comprising:

indicating to the performing network node which of the at least two resource specific parameters is to be used for performing the radio network operation task.

28. The method of claim 24, further comprising:

receiving, from the performing network node, a capability of the performing network node, which capability is a capability of handling the at least two resource specific parameters associated with the transmission of the first type of radio signal with different transmit power levels in different time periods for performing the radio network operation task.

29. The method of claim 24, further comprising:

receiving, from the wireless device, a capability associated with the wireless device, which capability is a capability of handling the at least two resource specific parameters associated with the transmission of the first type of radio signal with different power levels in different time periods for performing the radio network operation task.

30. The method of claim 24, further comprising:

transmitting, to the performing network node, a capability associated with the assisting network node, which capability is a capability of handling the at least two resource specific parameters associated with the transmission of the first type of radio signal with different power levels in different time periods.

31. The method of claim 24, wherein the radio network operation task is a task selected from the group comprising: interference estimation, interference prediction, path loss estimation, uplink power control, building up assistance data, informing a wireless device of a transmit power of the assisting network node, adjusting at least one transmit power related to the performing network node, configuring at least one signal transmitted by the performing network node, configuring at least one measurement pattern in the performing network node, configuring at least one measurement pattern for performing measurement in a cell associated with the performing network node, and/or adjusting a parameter value with regard to a parameter value used in one or more neighboring network node.

32. The method of claim 24, wherein the assisting network node is a first network node such as an eNode B, a base station, a relay node, or a donor node, and wherein the performing network node is an eNode B, a base station, a relay node, a donor node, a Radio Network Controller (RNC), a Base Station Controller (BSC), a positioning node or a Self-Optimizing/Organizing Network (SON) node.

33. The method of claim 24, wherein the radio network operation task is a task selected from the group comprising: network planning, management of parameters used in the communications network, optimization of parameters used in the communications network, modify or recommend a time period of the radio signal, recommend updates for the time period, recommend updates of a frequency-related configuration, building up positioning assistance data, and/or building up assistance data intended to support measurements.

34. The method of claim 33, wherein the assisting network node is an eNode B, a base station, a relay node, or a donor node, a Radio Network Controller (RNC), a Base Station Controller (BSC), a positioning node or a Self-Optimizing/Organizing Network (SON) node, and wherein the performing network node is a third network node such as a SON node, a Minimizing Drive Test (MDT) node, an Operation Support System (OSS) node, Operation and Maintenance (O&M) node, network monitoring node, coordinating node, or a positioning node.

35. The method of claim 24, wherein the first type of radio signal is:

any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS), or a Channel State Information Reference Signals (CSI-RS); or any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

36. A method of operating a performing network node for performing a radio network operation task, wherein the performing network node is comprised in a communications network, and wherein the method comprises:

receiving at least two resource specific parameters from an assisting network node comprised in the communications network, wherein the at least two resource specific parameters indicate different transmit power levels of a first type of radio signal, and wherein the different transmit power levels relate to at least two different resources in two different time periods for the first type of radio signal; and performing the radio network operation task using the at least two resource specific parameters.

37. The method of claim 36, wherein the at least two resource specific parameters are expressed in terms of one of the following:
  absolute values;
  at least one of the at least two resource specific parameters is expressed in terms of a relative value with respect to the other one of the at least two resource specific parameters; and
  at least one of the at least two resource specific parameters is expressed in terms of a relative value with respect to a reference value.

38. The method of claim 36, further comprising:
  determining which of the at least two resource specific parameters is to be used for performing the radio network operation task based on information associated with the at least two resource specific parameters, which information comprises one or more of: a pattern, radio signal type, measurement type, cell or node identification.

39. The method of claim 36, wherein the radio network operation task is a task selected from the group comprising: interference estimation, interference prediction, path loss estimation, uplink power control, building up assistance data, informing a wireless device comprised in the communications network of a transmit power of the assisting network node, adjusting at least one transmit power related to the performing network node, configuring at least one signal transmitted by the performing network node, configuring at least one measurement pattern in the performing network node, configuring at least one measurement pattern for performing measurement in a cell associated with the performing network node, and/or adjusting a parameter value with regard to a parameter value used in one or more neighboring network node.

40. The method of claim 36, wherein the assisting network node is a first network node such as an eNode B, a base station, a relay node, or a donor node, and wherein the performing network node is an eNode B, a base station, a relay node, a donor node, a Radio Network Controller (RNC), a Base Station Controller (BSC), a positioning node, or a Self-Optimizing/Organizing Network (SON) node.

41. The method of claim 36, wherein the radio network operation task is a task selected from the group comprising: network planning, management of parameters used in the communications network, optimization of parameters used in the communications network, modify or recommend a time period of the radio signal, recommend updates for the time period, recommend updates of a frequency-related configuration, building up positioning assistance data, and/or building up assistance data intended to support measurements.

42. The method of claim 41, wherein the assisting network node is an eNode B, a base station, a relay node, or a donor node, a Radio Network Controller (RNC), a Base Station Controller (BSC), a positioning node or a Self-Optimizing/Organizing Network (SON) node, and wherein the performing network node is a third network node such as a SON node, a Minimizing Drive Tests (MDT) node, an Operations Support System (OSS) node, an Operation and Maintenance (O&M) node, a network monitoring node, a coordinating node, or a positioning node.

43. The method of claim 36, wherein the first type of radio signal is:
  any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS), or a Channel State Information Reference Signals (CSI-RS), or
  any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

44. A wireless device for performing a measurement on a first type of radio signal, wherein the wireless device is comprised in a communications network, and wherein the wireless device comprises:
  a receiving circuit configured to receive at least two resource specific parameters for the first type of radio signal, which the at least two resource specific parameters indicate different transmit power levels of the first type of radio signal, wherein the different transmit power levels relate to two different resources in two different time periods for the first type of radio signal; and wherein
  the receiving circuit further is configured receive a first type of radio signal transmitted at two different transmit power levels; and
  a performing circuit configured to perform at least one measurement on the received first type of radio signal using the at least two resource specific parameters.

45. The wireless device of claim 44, wherein one of the at least two resources has a lower interference than the other of the at least two resources.

46. The wireless device of claim 45, wherein the receiving circuit further is configured to:
  receive a first resource specific transmit power parameter that is associated with the transmit power of the first type of radio signal transmitted in a first resource in a first time period; and
  receive a second resource specific transmit power parameter that is associated with the transmit power of the first type of radio signal transmitted in a second resource in a second time period.

47. The wireless device of claim 45, wherein the performing circuit further is configured to perform at least one of a mobility measurement, a positioning measurement; a timing measurement; a measurement for power control; a path loss measurement; a measurement for scheduling; a Channel State Information (CSI) measurement; a measurement for demodulation or reception of user data or control information; paging reception; Broadcast Channel (BCH) reception; Physical Downlink Shared Channel (PDSCH) reception; control channel reception; Physical Multicast Channel (PMCH) reception; a positioning measurement on a Positioning Reference Signal (PRS); or a Cell-specific Reference Signal (CRS); a cell identification measurement involving a measurement on a synchronization signal; radio link monitoring; a measurement of path loss; a channel estimation; and a measurement of Radio Resource Management (RRM).

48. The wireless device of claim 45, further comprising:
  a complying circuit configured to comply to at least one pre-defined requirement associated with the performed measurement on the radio signal using the at least two resource specific parameters, which pre-defined requirement is at least one of: cell identification time based on the received first type of signal transmitted at different transmit power levels in different resources, radio link monitoring requirement, measurement or evaluation period of measurement, measurement accuracy of the measurement or reporting range of the measurement, receiver dynamic range requirement, adaptively using two dynamic range configurations.

49. The wireless device of claim 45, further comprising:
a transmitting circuit configured to transmit a result of the performed measurement to the first assisting network node or to the second assisting network node.

50. The wireless device of claim 49, wherein the transmitting circuit further is configured to transmit, to the first assisting network node or to the second assisting network node, a capability of handling resource specific parameters associated with the transmission of the radio signal with different transmit power levels in different time periods for performing the at least one measurement.

51. The wireless device of claim 50, wherein the transmitting circuit further is configured to transmit the capability proactively, on request, or at an event such as at handover or connection set up.

52. The wireless device of claim 50, wherein the transmitting circuit further is configured to transmit the capability for a specific signal type or subset of signal types or for all signal types.

53. The wireless device of claim 45, wherein the first type of radio signal is:
any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS) or a Channel State Information Reference Signals (CSI-RS), or
any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

54. The wireless device of claim 44, wherein the receiving circuit further is configured to receive the at least two resource specific parameters from a first assisting network node serving the wireless device and comprised in the communications network or from a second assisting network node comprised in the communications network, wherein the first assisting network node is an eNode B, a base station, a relay node, or a donor node, and wherein the second assisting network node is an eNode B, a base station, a relay node, a donor node, a Radio Network Controller (RNC), a Base Station Controller (BSC), a positioning node or a Self-Optimizing/Organizing Network (SON) node.

55. An assisting network node for assisting a wireless device in performing a measurement on a first type of radio signal, wherein the assisting network node and the wireless device are comprised in a communications network, and wherein the assisting network node comprises:
a determining circuit configured to determine at least two different resources for the first type of radio signal in two different time periods, wherein each of the at least two different resources is associated with a resource specific parameter; and
a transmitting circuit configured to transmit, to the wireless device, the first type of radio signal at different transmit power levels; and wherein
the transmitting circuit further is configured to transmit, to the wireless device, the at least two resource specific parameters that indicate different transmit power levels of the first type of radio signal associated with two different time periods, wherein the different transmit power levels relate to the at least two different resources, and whereby the wireless device may perform at least one measurement on the received first type of radio signal using the at least two resource specific parameters.

56. The assisting network node of claim 55, wherein one of the at least two different resources has a lower interference than the other of the at least two different resources.

57. The assisting network node of claim 55, wherein the transmitting circuit further is configured to:
transmit a first resource specific transmit power parameter that is associated with the transmit power of the first type of radio signal transmitted in a first resource in a first time period; and
transmit a second resource specific transmit power parameter that is associated with the transmit power of the first type of radio signal transmitted in a second resource in a second time period.

58. The assisting network node of claim 55, wherein the at least two resource specific parameters for the first type of radio signal are expressed in terms of one of the following:
absolute values;
at least one of the at least two resource specific parameters is expressed in terms of a relative value with respect to the other one of the at least two resource specific parameter; and
at least one of the at least two resource specific parameters is expressed in terms of a relative value with respect to a reference value.

59. The assisting network node of claim 55, further comprising:
an indicating circuit configured to indicate to the wireless device which of the at least two resource specific parameters is to be used for performing the at least one measurement on the first type of radio signal.

60. The assisting network node of claim 55, further comprising:
a receiving circuit configured to receive, from the wireless device, a result of the performed at least one measurement on the first type of radio signal.

61. The assisting network node of claim 60, wherein the receiving circuit further is configured to receive, from the wireless device, a capability of handling resource specific parameters associated with the transmission of the first type of radio signal with different power levels in different time periods for performing at least one measurement on the first type of radio signal.

62. The assisting network node of claim 61, wherein the receiving circuit further is configured to receive the capability proactively, on request, or at an event such as at handover or initial set up.

63. The assisting network node of claim 61, wherein the receiving circuit further is configured to receive the capability for a specific signal type or subset of signal types or for all signal types.

64. The assisting network node of claim 55, wherein the transmitting circuit further is configured to transmit a capability of the assisting network node, which capability is a capability of handling the at least two resource specific parameters associated with the transmission of the first type of radio signal with different power levels in different time periods to a first assisting network node, a second assisting network node, and/or to the wireless device, wherein the first assisting network node is an eNode B, a base station, a relay node, or a donor node, and wherein the second assisting network node is an eNode B, a base station, a relay node, a donor node, a Radio Network Controller (RNC), a Base Station Controller (BSC), a positioning node, or a Self-Optimizing/Organizing Network (SON) node.

65. The assisting network node of claim 55, wherein the first type of radio signal is:
   any one of the following physical signals: Cell-specific Reference Signal (CRS), a synchronization signal, a Multimedia Broadcast Single Frequency Network (MBSFN) reference signal, a specific reference signal for the wireless device, a Positioning Reference Signal (PRS), or a Channel State Information Reference Signals (CSI-RS), or
   any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid ARQ Indicator Channel (PHICH).

66. The assisting network node of claim 55, further comprising:
   a complying circuit configured to comply to at least one pre-defined requirement associated with the at least two resource specific parameters related for the two different power levels, which pre-defined requirement is at least one of: transient periods, power adjustment accuracy, increased dynamic power ranges, more than one dynamic range configured by the assisting network node.

67. An assisting network node for assisting a performing network node in performing a radio network operation task, wherein the assisting network node and the performing network node are comprised in a communications network, and wherein the assisting network node comprises:
   a determining circuit configured to determine at least two different resources for a first type of radio signal, wherein each of the at least two different resources is associated with a resource specific parameter, and wherein one of the at least two different resources has a lower interference than the other of the at least two different resources; and
   a transmitting circuit configured to transmit to the performing network node the at least two resource specific parameters, wherein the at least two resource specific parameters indicate different transmit power levels of the first type of radio signal, and wherein the different transmit power levels relate to the at least two different resources in two different time periods for the first type of radio signal, whereby the performing network node may perform the radio network operation task using the at least two resource specific parameters.

68. The assisting network node of claim 67, wherein the transmitting circuit further is configured to:
   transmit a first resource specific transmit power parameter that is associated with the transmit power of the signal transmitted in a first resource in a first period of time; and
   transmit a second resource specific transmit power parameter that is associated with the transmit power of the signal transmitted in a second resource in a second period of time.

69. The assisting network node of claim 67, wherein the at least two resource specific parameters are expressed in terms of one of the following:
   absolute values;
   at least one of the at least two resource specific parameters is expressed in terms of a relative value with respect to the other one of the at least two resource specific parameters; and
   at least one of the at least two resource specific parameters is expressed in terms of a relative value with respect to a reference value.

70. The assisting network node of claim 67, further comprising:
   an indicating circuit configured to indicate to the performing network node which of the at least two resource specific parameters is to be used for performing the radio network operation task.

71. The assisting network node of claim 67, further comprising:
   a receiving circuit configured to receive, from the performing network node, a capability of the performing network node, which capability is a capability of handling the at least two resource specific parameters associated with the transmission of the first type of radio signal with different power levels in different time periods for performing the radio network operation task.

72. The assisting network node of claim 71, wherein the receiving circuit further is configured to receive, from the wireless device, a capability associated with the wireless device, which capability is a capability of handling the at least two resource specific parameters associated with the transmission of the first type of radio signal with different transmit power levels in different time periods for performing the radio network operation task.

73. The assisting network node of claim 67, wherein the transmitting circuit further is configured to transmit, to the performing network node, a capability associated with the assisting network node, which capability is a capability of handling the at least two resource specific parameters associated with the transmission of the first type of radio signal with different power levels in different time periods.

74. The assisting network node of claim 67, wherein the radio network operation task is a task selected from the group comprising: interference estimation, interference prediction, path loss estimation, uplink power control, building up assistance data, informing a wireless device of a transmit power of the assisting network node, adjusting at least one transmit power related to the performing network node, configuring at least one signal transmitted by the performing network node, configuring at least one measurement pattern in the performing network node, configuring at least one measurement pattern for performing measurement in a cell associated with the performing network node, and/or adjusting a parameter value with regard to a parameter value used in one or more neighboring network nodes.

75. The assisting network node of claim 67, wherein the assisting network node is a first network node such as an eNode B, a base station, a relay node, or a donor node, and wherein the performing network node is an eNode B, a base station, a relay node, a donor node, a Radio Network Controller (RNC), a Base Station Controller (BSC), a positioning node or a Self-Optimizing/Organizing Network (SON) node.

76. The assisting network node of claim 67, wherein the radio network operation task is a task selected from the group comprising: network planning, management of parameters used in the communications network, optimization of parameters used in the communications network, modify or recommend a time period of the first type of radio signal, recommend updates for the time period, recommend updates of a frequency-related configuration, building up positioning assistance data, and/or building up assistance data intended to support measurements.

77. The assisting network node of claim 76, wherein the assisting network node is an eNode B, a base station, a relay node, or a donor node, a Radio Network Controller (RNC), a Base Station Controller (BSC), a positioning node or a Self-Optimizing/Organizing Network (SON) node, and wherein the performing network node is a third network node such as a SON node, a Minimizing Drive Test (MDT) node, an Operation Support System (OSS) node, Operation and Maintenance (O&M) node, network monitoring node, coordinating node, or a positioning node.

78. The assisting network node of claim 67, wherein the first type of radio signal is:
  any one of the following physical signals: Cell-specific Reference Signal (CRS), a synchronization signal, a Multimedia Broadcast Single Frequency Network (MB-SFN) reference signal, a specific reference signal for the wireless device, a Positioning Reference Signal (PRS), or a Channel State Information Reference Signals (CSI-RS), or
  any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

79. A performing network node for performing a radio network operation task, wherein the performing network node is comprised in a communications network, and wherein the performing network node comprises:
  a receiving circuit configured to receive at least two resource specific parameters from an assisting network node comprised in the communications network, wherein the at least two resource specific parameters indicate different transmit power levels of a first type of radio signal, and wherein the different transmit power levels relate to at least two different resources in two different time periods for the first type of radio signal; and
  a performing circuit configured to perform the radio network operation task using the at least two resource specific parameters.

80. The performing network node of claim 79, wherein the at least two resource specific parameters are expressed in terms of one of the following:
  absolute values;
  at least one of the at least two resource specific parameters is expressed in terms of a relative value with respect to the other one of the at least two resource specific parameters; and
  at least one of the at least two resource specific parameters is expressed in terms of a relative value with respect to a reference value.

81. The performing network node of claim 79, further comprising:
  a determining circuit configured to determine which of the at least two resource specific parameters is to be used for performing the radio network operation task based on information associated with the at least two resource specific parameters, which information comprises one or more of: a pattern, radio signal type, measurement type, cell or node identification.

82. The performing network node of claim 79, wherein the radio network operation task is a task selected from the group comprising: interference estimation, interference prediction, path loss estimation, uplink power control, building up assistance data, informing a wireless device comprised in the communications network of a transmit power of an assisting network node, adjusting at least one transmit power related to the performing network node, configuring at least one signal transmitted by the performing network node, configuring at least one measurement pattern in the performing network node, configuring at least one measurement pattern for performing measurement in a cell associated with the performing network node, and/or adjusting a parameter value with regard to a parameter value used in one or more neighboring assisting network nodes.

83. The performing network node of claim 79, wherein the assisting network node is a first network node such as an eNode B, a base station, a relay node, or a donor node, and wherein the performing network node is an eNode B, a base station, a relay node, a donor node, a Radio Network Controller (RNC), a Base Station Controller (BSC), a positioning node or a Self-Optimizing/Organizing Network (SON) node.

84. The performing network node of claim 79, wherein the radio network operation task is a task selected from the group comprising: network planning, management of parameters used in the communications network, optimization of parameters used in the communications network, modify or recommend a time period of the first type of radio signal, recommend updates for the time period, recommend updates of a frequency-related configuration, building up positioning assistance data, and/or building up assistance data intended to support measurements.

85. The performing network node of claim 84, wherein the assisting network node is an eNode B, a base station, a relay node, or a donor node, a Radio Network Controller (RNC), a Base Station Controller (BSC), a positioning node or a Self-Optimizing/Organizing Network (SON) node, and wherein the performing network node is a third network node such as a SON node, a Minimizing Drive Tests (MDT) node, an Operations Support System (OSS) node, an Operation and Maintenance (O&M) node, a network monitoring node, a coordinating node, or a positioning node.

86. The performing network node of claim 79, wherein the first type of radio signal is:
  any one of the following physical signals: Cell-specific Reference Signal (CRS), a synchronization signal, a Multimedia Broadcast Single Frequency Network (MB-SFN) reference signal, a specific reference signal for the wireless device, a Positioning Reference Signal (PRS), or a Channel State Information Reference Signals (CSI-RS), or
  any one of the following physical channels: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), Physical Hybrid Automatic Repeat-reQuest (ARQ) Indicator Channel (PHICH).

* * * * *